(12) United States Patent
Stovall

(10) Patent No.: US 9,288,165 B1
(45) Date of Patent: Mar. 15, 2016

(54) SYSTEM AND METHOD FOR PERSONALIZED COMMUNICATION NETWORK

(71) Applicant: Parlant Technology, Inc., Provo, UT (US)

(72) Inventor: Daniel Stovall, Provo, UT (US)

(73) Assignee: Parlant Technology, Inc., Provo, UT (US)

( * ) Notice: Subject to any disclaimer, the term of this patent is extended or adjusted under 35 U.S.C. 154(b) by 0 days.

(21) Appl. No.: 14/137,469

(22) Filed: Dec. 20, 2013

Related U.S. Application Data

(63) Continuation-in-part of application No. 14/019,068, filed on Oct. 4, 2013, which is a continuation-in-part of application No. 13/709,293, filed on Dec. 10, 2012, application No. 14/137,469, which is a (Continued)

(51) Int. Cl.
*G06F 15/16* (2006.01)
*H04L 12/58* (2006.01)

(52) U.S. Cl.
CPC ...................................... *H04L 51/00* (2013.01)

(58) Field of Classification Search
USPC .......................................................... 709/227
See application file for complete search history.

(56) References Cited

U.S. PATENT DOCUMENTS

| | | | |
|---|---|---|---|
| 6,430,624 B1 | 8/2002 | Jamtgaard et al. | |
| 6,928,328 B2 | 8/2005 | Deitz et al. | |
| 7,065,555 B2 | 6/2006 | Foulger et al. | |
| 7,496,183 B1 | 2/2009 | Rodkey | |
| 7,519,165 B1 | 4/2009 | Rodkey | |
| 7,684,548 B1 | 3/2010 | Rodkey | |
| 8,145,704 B2 | 3/2012 | Marcus | |
| 8,150,844 B2 * | 4/2012 | Redstone et al. | 707/724 |
| 8,181,107 B2 | 5/2012 | Melnyk et al. | |
| 8,332,475 B2 * | 12/2012 | Rosen et al. | 709/206 |
| 8,412,794 B2 | 4/2013 | Beykpour et al. | |

(Continued)

OTHER PUBLICATIONS

Homeworknow.com, Communicate Better, homeworknow.com, homeworknow.com/abou/saleskit/hwnowbrochure.pdf, last accessed Jan. 3, 2013.

(Continued)

*Primary Examiner* — Alicia Baturay
(74) *Attorney, Agent, or Firm* — Mark F. Wright; Wright Law Group, PLLC; Jacob Ong

(57) ABSTRACT

The various implementations of the present invention are provided as a computer-based system configured to allow for the creation of a personalized communications network. A message recipient can establish one or more messaging relationships with persons and entities or message originators and configure their message recipient account to receive messages from the message originators without divulging or compromising the message recipient's contact information. The content and messaging platform for delivery of the messages can be customized based on a classification established for each messaging relationship between a message originator and a message recipient. A message originator can utilize the personalized communications network to send messages to multiple message recipients, even if the message originator does not have knowledge of, or direct access to, the contact information for the message recipients. The collection of the messaging relationships established by a message recipient and message originators is a "personalized communications network."

23 Claims, 11 Drawing Sheets

Related U.S. Application Data continuation-in-part of application No. 13/835,633, filed on Mar. 15, 2013, now Pat. No. 8,832,301, which is a continuation-in-part of application No. 13/767,722, filed on Feb. 14, 2013, and a continuation-in-part of application No. 13/709,293, application No. 14/137,469, which is a continuation-in-part of application No. 13/767,722, which is a continuation-in-part of application No. 13/348,221, filed on Jan. 11, 2012, which is a continuation-in-part of application No. 13/188,393, filed on Jul. 21, 2011, application No. 14/137,469, which is a continuation-in-part of application No. 13/348,221, which is a continuation-in-part of application No. 13/188,393, application No. 14/137,469, which is a continuation-in-part of application No. 13/188,393.

(56) References Cited

U.S. PATENT DOCUMENTS

| | | | |
|---|---|---|---|
| 8,463,795 | B2 | 6/2013 | van Hoff |
| 8,578,274 | B2 | 11/2013 | Druzgalski et al. |
| 8,818,909 | B2 * | 8/2014 | Bosworth et al. ............. 705/319 |
| 2002/0035579 | A1 | 3/2002 | Wang et al. |
| 2002/0120697 | A1 | 8/2002 | Generous et al. |
| 2002/0143885 | A1 | 10/2002 | Ross, Jr. |
| 2003/0046421 | A1 | 3/2003 | Horvitz et al. |
| 2003/0110234 | A1 | 6/2003 | Egli et al. |
| 2004/0030781 | A1 | 2/2004 | Etesse et al. |
| 2004/0219494 | A1 | 11/2004 | Boon |
| 2005/0015456 | A1 | 1/2005 | Martinson, Jr. |
| 2005/0165615 | A1 | 7/2005 | Minar |
| 2005/0233294 | A1 | 10/2005 | Keitch |
| 2006/0029194 | A1 | 2/2006 | Hurd et al. |
| 2006/0035205 | A1 | 2/2006 | Dobson et al. |
| 2006/0053156 | A1 | 3/2006 | Kaushansky et al. |
| 2006/0095315 | A1 | 5/2006 | Ano |
| 2006/0282303 | A1 | 12/2006 | Hale et al. |
| 2007/0100959 | A1 | 5/2007 | Eichstaedt et al. |
| 2007/0292835 | A1 | 12/2007 | Hartman et al. |
| 2008/0040502 | A1 | 2/2008 | Holsberry |
| 2008/0273699 | A1 | 11/2008 | Roth |
| 2008/0312946 | A1 | 12/2008 | Valentine et al. |
| 2009/0035733 | A1 | 2/2009 | Meitar et al. |
| 2009/0125582 | A1 | 5/2009 | Marcus |
| 2009/0280460 | A1 | 11/2009 | Yaskin |
| 2010/0057859 | A1 * | 3/2010 | Shen et al. ................ 709/206 |
| 2010/0063856 | A1 | 3/2010 | Williams et al. |
| 2010/0156631 | A1 | 6/2010 | Roth |
| 2010/0162364 | A1 | 6/2010 | Roth et al. |
| 2010/0179915 | A1 | 7/2010 | Nastacio |
| 2010/0205169 | A1 | 8/2010 | Narayan et al. |
| 2010/0211866 | A1 | 8/2010 | Nicholas et al. |
| 2010/0274796 | A1 | 10/2010 | Beauregard et al. |
| 2011/0082808 | A1 | 4/2011 | Beykpour et al. |
| 2011/0119239 | A1 | 5/2011 | Jabaud et al. |
| 2011/0173076 | A1 | 7/2011 | Eggleston et al. |
| 2011/0179020 | A1 | 7/2011 | Ozzie et al. |
| 2011/0187488 | A1 | 8/2011 | Fiske et al. |
| 2011/0212430 | A1 | 9/2011 | Smithmier et al. |
| 2011/0219094 | A1 | 9/2011 | Turakhia |
| 2012/0059795 | A1 | 3/2012 | Hersh et al. |
| 2012/0113264 | A1 | 5/2012 | Moshrefi et al. |
| 2012/0278428 | A1 | 11/2012 | Harrison et al. |
| 2013/0007143 | A1 | 1/2013 | Rinard et al. |
| 2013/0007195 | A1 | 1/2013 | Rinard et al. |
| 2013/0046851 | A1 | 2/2013 | Marcus |
| 2013/0060791 | A1 | 3/2013 | Szalwinski et al. |
| 2013/0110978 | A1 | 5/2013 | Gordon et al. |

OTHER PUBLICATIONS

Blackboard Mobile; Generally Available Modules, Features, and Functionality (click on View detailed feature availability by platform: link at www.blackboard.com/Platforms/Mobile/Products/Mobile-Central/Features.aspx), last accessed on Jan. 3, 2013.

Insideflipboard; Flipboard User Guide; Glipboard Tips; available at tips.flipboard.com/2012//06/22/flipboard-user-guide/; last accessed on Jan. 3, 2013.

PRNewswire: Edison Public Schools Will Be First U.S. K-12 District to Launch Blackboard Mobile Central App; PR Newswire.com; Aug. 18, 2011; available at www.prnewswire.com/news-releases/edison-public-schools-will-be-first-us-k-12-district-to-launch-blackboard-mobile-central-app-12800148.html; last accessed on Jan. 3, 2013.

EBD Group; Partnering—Biotechnology Partnering Conference—BIO-Europe 2013-Vienna Austria; www.ebdgroup.com/bioeurope/partnering/index/php; last accessed Sep. 2013.

ABA Techshow; "ABA Techshow 2013"; www.techshow.com; available at www.techshow.com/conference/app; last accessed Sep. 2013.

Websplashpeter, Apptivate—Working with News, Youtube.com, uploaded on Mar. 7, 2011, www.youtube.com/watch?v=IF4JyDNKDdY (last accessed Apr. 30, 2014), www.google.com/support/youtube (contact address).

Byrne, Richard. Class Parrot—Text Students and Parents for Free Technology for Teachers, available at, www.freetech4teachers.com/s001/10/class-parrot-text-students-and-parents.Html#.UTfmvRzqn2s. Published Oct. 6, 2011.

Thurana, Jeffry. "Edmodo-A Social Network for Teachers & Students". Available at www.makeuseof.com/tag/edumodo-social-network-teachers-students/. Published Nov. 17, 2010.

Edmodo. Getting Started (User Guide). Available at help.edmodo.com/wp-content/uploads/2011/09/UserGuide_Sep11.pdf.

Pearson Education, Inc. Prevent: Bringing the Dropout Challenge into Focus. Pamphlet 2010.

Skyward, Student Management Suite (SMS), Aug. 12, 2011, NA, NA, Skyward, n.

ExLogical: The Keystone Student Information System (2002). Retrieved Mar. 28, 2013 from web.archive.org/web/20020605155539/http://exlogia.com/kystpd.htm.

PowerSchool, Jun. 24, 2003. "Attendance User Guide PowerSchool Student Information System" retrieved on May 13, 2014 from www.tularosa.k12.nm.us/powerschool/Documentation/User%20Guides/attendance_3.6.0.pdf>.

Newport-Mesa Unified School District, Broadcast Message Authorization Form, Document, Dec. 21, 2012, All Pages, available at nmusd.ca.schoolloop.com/file/1218998591277/1220710269125/1830162478207164218.pdf.

* cited by examiner

| RECIPIENT 1 (WEEKDAY) | |
|---|---|
| 12:00 8:00 | 1. EMAIL |
| | 2. TEXT |
| | 3. FACEBOOK |
| | 4. SMS |
| | 5. PHONE |
| 8:00 10:00 | 1. EMAIL |
| 10:00 12:00 | 1. TEXT |
| | 2. SKYPE |
| 12:00 1:00 | 1. PHONE |
| | 2. FACEBOOK |
| 1:00 5:00 | 1. EMAIL |
| | 2. TEXT |
| | 3. FACEBOOK |
| | 4. SMS |
| | 5. PHONE |
| 5:00 10:00 | 1. PHONE |
| | 2. TEXT |
| | 3. EMAIL |
| 10:00 12:00 | 1. EMAIL |
| SNAIL MAIL? YES | |

| RECIPIENT 2 (WEEKDAY) | |
|---|---|
| 12:00 6:00 | 1. EMAIL |
| 6:00 9:00 | 1. PHONE |
| | 2. TEXT |
| | 3. SMS |
| 9:00 12:00 | 1. PHONE |
| | 2. FACEBOOK |
| 12:00 1:00 | 1. PHONE |
| | 2. FACEBOOK |
| | 3. SMS |
| | 4. RSS |
| 1:00 6:00 | 1. EMAIL |
| | 2. TWITTER |
| | 3. FACEBOOK |
| | 4. SKYPE |
| | 5. PHONE |
| 6:00 7:00 | 1. PHONE |
| | 2. TEXT |
| | 3. EMAIL |
| 7:00 12:00 | 1. EMAIL |
| | 2. PHONE |
| SNAIL MAIL? NO | |

SYSTEM AND METHOD FOR PERSONALIZED COMMUNICATION NETWORK

CROSS REFERENCE TO RELATED APPLICATIONS

This patent application is a continuation-in-part of U.S. patent application Ser. No. 14/019,068, which application was filed on Oct. 4, 2013, which application is now pending and which application is incorporated herein by reference. U.S. patent application Ser. No. 14/019,068 is a continuation-in-part of U.S. patent application Ser. No. 13/709,293 which application was filed on Dec. 10, 2012, which application is now pending and which application is incorporated herein by reference.

This patent application is a continuation-in-part of U.S. patent application Ser. No. 13/835,633, which application was filed on Mar. 15, 2013, which application is now pending, and which application is incorporated by reference herein. U.S. patent application Ser. No. 13/835,633 is a continuation-in-part of U.S. patent application Ser. No. 13/709,293, which application was filed on Dec. 10, 2012, which application is now pending and which application is incorporated herein by reference. U.S. patent application Ser. No. 13/835,633 is also a continuation-in-part of U.S. patent application Ser. No. 13/767,722 which application was filed on Feb. 14, 2013, which application is now pending and which application is also incorporated herein by reference.

This patent application is a continuation-in-part of U.S. patent application Ser. No. 13/767,722, which application was filed on Feb. 14, 2013, which application is now pending and which application is incorporated by reference herein. U.S. patent application Ser. No. 13/767,722 is a continuation-in-part of U.S. patent application Ser. No. 13/348,221 which application was filed on Jan. 11, 2012, which application is now pending and which application is incorporated herein by reference. U.S. patent application Ser. No. 13/348,221 is a continuation-in-part of U.S. patent application Ser. No. 13/188,393 which application was filed on Jul. 21, 2011, which application is now pending and which application is incorporated by reference herein. U.S. patent application Ser. No. 13/767,722 is also a continuation-in-part of U.S. patent application Ser. No. 13/709,293 which application was filed on Dec. 10, 2012, which application is now pending and which application is also incorporated herein by reference.

This application is a continuation-in-part of U.S. patent application Ser. No. 13/348,221, which application was filed on Jan. 11, 2012, which application is now pending and which application is incorporated herein by reference. U.S. patent application Ser. No. 13/348,221 is a continuation-in-part of U.S. patent application Ser. No. 13/188,393, which application was filed on Jul. 21, 2011, which application is now pending and which application is incorporated herein by reference.

This application is a continuation-in-part of U.S. patent application Ser. No. 13/188,393, which application was filed on Jul. 21, 2011, which application is now pending and which application is incorporated herein by reference.

BACKGROUND OF THE INVENTION

1. Technical Field

The present invention relates generally to the field of interactive communication and more specifically relates to the creation and delivery of messages to a message recipient from multiple message originators via a customizable communications platform.

2. Background Art

Most schools, commercial businesses, government agencies, municipalities, cities, counties, and other organizations frequently find it useful to communicate various messages to their constituencies (e.g., owners, managers, employees, workers, students, parents, teachers, etc.). Since communication in the world today encompasses much more than simple messaging tasks such as phone calls and letters, many entities are finding it increasingly difficult to maintain the desired level of communication with their constituencies.

Some of the main problems that hamper efforts to create an environment of effective communication and typically lead to ineffective and/or inefficient communication are driven by information overload and technology. Since there are so many available communication mediums and messaging platforms available, it may be somewhat complicated to get the desired message to the desired audience. For example, in addition to traditional "snail mail" and telephone communication, email, Skype®, Twitter®, Facebook®, Tumblr®, Instagram®, Google Chat®, Google+®, etc. are all relatively new communication methods that have been developed in recent years. Each of these communication platforms has a unique specific interface and protocol and, where there are multiple recipients for a given message, it can be time consuming and somewhat problematic to select and format the message for each possible combination of message recipients and possible communication platforms.

Additionally, even if the correct messaging format and delivery schedule for a given message recipient have been identified, many message recipients have established messaging relationships with multiple entities and each entity may have a different application for establishing the communication channel with the message recipient. In some cases, this means a message recipient may need to set up a separate account with separate login credentials and account information being required for each account. Not only is this inconvenient for the message recipient, this practically ensures that data redundancy will be introduced into one or more of the disparate accounts for a given message recipient as the message recipient changes phone numbers, addresses, etc.

Finally, many message recipients are increasingly hesitant to share their contact information with multiple potential message originators due to the increased probability of receiving unsolicited messages or "spam" or out of a fear that their contact information may be inadvertently exposed to unintended third parties, thereby compromising their digital identity. Accordingly, without improvements in the current systems, procedures, and methods for the communication of messages from a message originator to a message recipient, the ability to effectively and efficiently provide important messages to the desired constituency will continue to be sub-optimal.

BRIEF SUMMARY OF THE INVENTION

The various implementations of the present invention are provided as a computer-based system configured to allow for the creation of a personalized communications network. A message recipient can establish one or more messaging relationships with persons and entities or message originators and configure their message recipient account to receive messages from the message originators without divulging or compromising the message recipient's contact information. The content and messaging platform for delivery of the messages can be customized based on a classification established for each messaging relationship between a message originator and a message recipient. The collection of the messaging relationships established by a message recipient and message originators is a "personalized communications network."

A message originator can utilize the personalized communications network to send messages to multiple message recipients, even if the message originator does not have knowledge of, or direct access to, the contact information for the message recipients. Additionally, each message recipient can customize the message delivery options for each message originator to ensure that messages are received in the most appropriate manner and establish communication parameters without divulging the message recipient's contact information to the message originator.

While useful for many environments, the most preferred embodiments of the present invention are adapted for use in a typical community to provide residents and others associated with the community with enhanced communication capabilities.

BRIEF DESCRIPTION OF THE FIGURES

The preferred embodiments of the present invention will hereinafter be described in conjunction with the appended drawings, wherein like designations denote like elements, and.

DETAILED DESCRIPTION OF THE INVENTION

Figure 1:
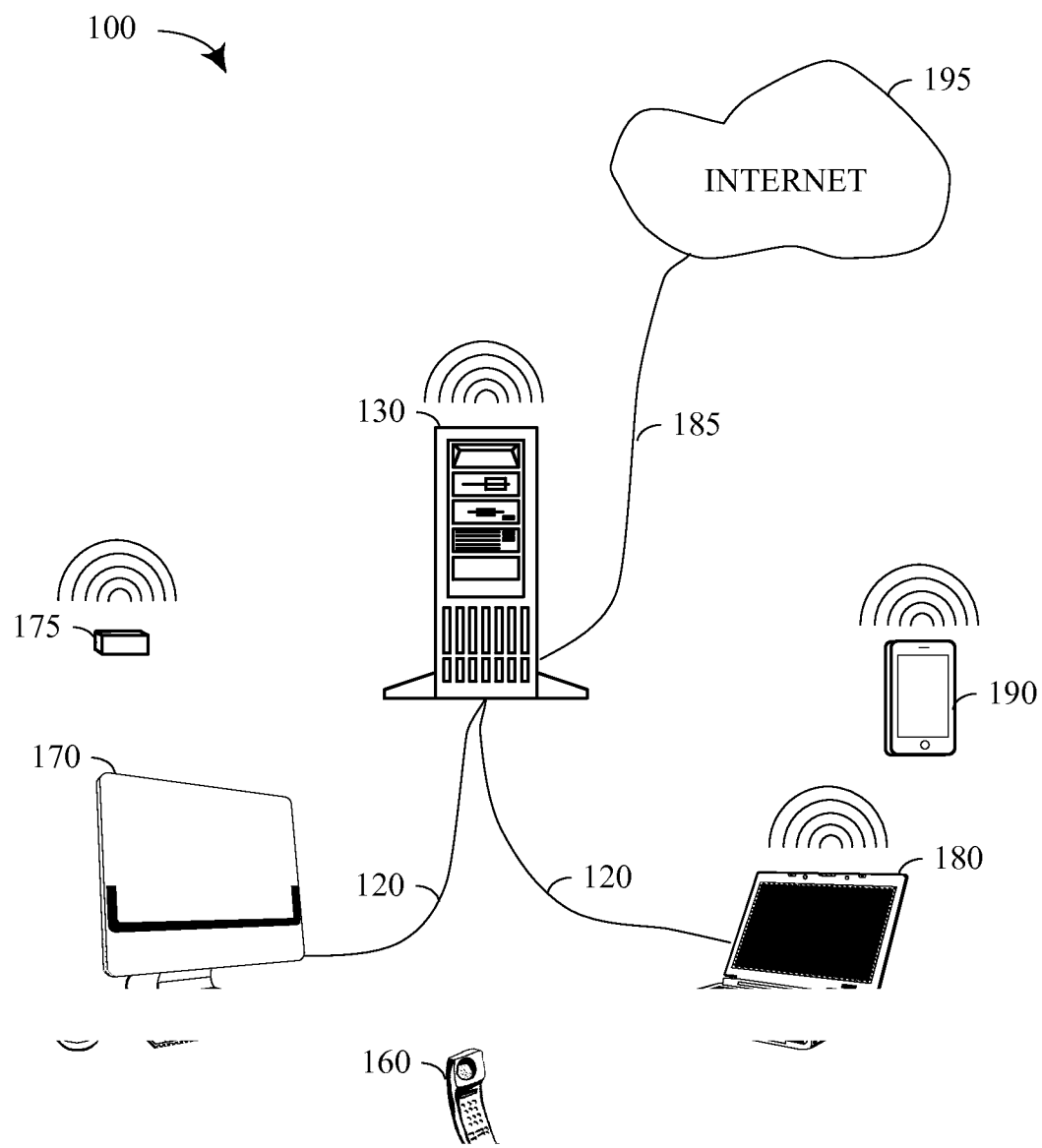
FIG. 1 is a schematic diagram of a computer-based system for providing a personalized communication network in accordance with a preferred exemplary embodiment of the present invention.

The various implementations of the present invention are provided as a computer-based system configured to allow for the creation of a personalized communications network. A message recipient can establish one or more relationships with persons and entities or message originators and configure their message recipient account to receive messages from the message originators without divulging or compromising the message recipient's contact information. The content and messaging platform for delivery of the messages can be customized based on a relationship classification established for each relationship between a message originator and a message recipient. A message originator can utilize the personalized communications network to send messages to multiple message recipients, even if the message originator does not have knowledge of, or direct access to, the contact information for the message recipients. Additionally, each message recipient can customize the message delivery options for each message originator to ensure that messages are received in the most appropriate manner and establish communication parameters without divulging the message recipient's contact information to the message originator.

Additionally, in the most preferred embodiments of the present invention, each organization or entity, as a message originator, may have a specialized mobile application or "app" that may be configured as part of the personalized communication network. Each message recipient may download multiple apps, with each app representing an organization or entity with which the message recipient has an established relationship. In the case of multiple message originators, a message recipient can link their account information to each relevant message originator and "merge" or consolidate their contact information and user preferences for message delivery into a single user account. This provides each message recipient with a centralized data storage location for maintaining his or her messaging preferences and contact information. In this fashion, the message recipient can create a customized communication network, thereby maximizing the efficiency with which they receive messages from message originators while shielding their contact information from message originators.

The system provides for the efficient delivery of messages from one or more message originators to one or more message recipients via a plurality of communication or messaging platforms. A message originator can create a single message and specify one or more message recipients, multiple communication platforms (including a priority preference), and delivery scheduling, all from a graphical user interface on a mobile communication device or a computer. The message will be automatically formatted for the selected message recipients, the available and desired communication platforms in the desired priority order, and scheduled for delivery to the message recipients at the selected time(s). On the message recipient side, each message recipient can specify the desired communication platform and preference priority for receipt of messages, along with the desired timing for delivery of messages from each potential message originator.

Generic message sending and receiving protocols may also be established where user preferences have not been specified.

Aspects of the present invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in or on a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Additionally, various preferred embodiments of the program product may be configured to: create and modify multiple databases; track, update and store data related to the optimized creation and delivery of messages; configure and implement various search and retrieve functions for a multitude of search requests and determinations made by users of the computer-based communication system; track and store information about various services and program features; update and transmit message to one or more end users consumers; and provide one or more user interfaces for accomplishing all of these functions.

In this fashion, the appropriate entities (i.e., business owners, managers, administrators, teachers, parents, students, etc.) can utilize the program product to initiate and complete a wide variety of database-related applications for the provision of a personalized communication network services. Similarly, a program product in accordance with one or more preferred embodiments of the present invention can also be configured to perform substantially all of the steps depicted and described in conjunction with the figures below for implementing a personalized communication network system as described herein.

While the present invention will be described in detail by using various examples, those skilled in the art will recognize that the equipment, processes, methods and techniques described herein have broad applicability to other environments and applications where quick and efficient access to a personalized communication network services is desirable.

Referring now to FIG. 1, a computer-based system for providing a personalized communication network 100 in accordance with a preferred exemplary embodiment of the present invention comprises: a data server (computer) 130; at least one of a desktop computer 170 or a laptop computer 180; an optional telephone 160; a wireless communication device 175; and a mobile communication device 190 (e.g., a smartphone or personal digital assistant "PDA") all connected or coupled via a local area network 120 to the Internet 195 via an Internet connection 185.

Taken together, the components of computer-based system for providing a personalized communication network 100 provide a platform for quickly and efficiently creating and delivering one or more messages to a wide variety of individuals and groups of individuals via a communication network that has been customized by and for the message recipient. Computer-based system 100 provides a mechanism for message originators and message recipients to efficiently and effectively create, schedule, and deliver messages across a wide range of message platforms and mediums. Computer-based system 100 also provides a mechanism for message recipients to maintain their personal contact information in a database that is accessible to message originators without necessarily exposing the message recipient's contact information to the message originator.

In the most preferred embodiments of the present invention, computer-based system for providing a personalized communication network 100 is configured as a system that will be used to disseminate messages to message recipients on behalf of a community including schools, municipalities, businesses, as well as civic and similar entities. In this preferred embodiment, the group of users for computer-based system for providing a personalized communication network 100 will typically include administrators for individual schools as well as school board and school district officials, teachers, staff, community members, parents, and students.

Network 120 represents any suitable computer communication link or similar communication mechanism, including some combination of a hardwired connection, an internal or external bus, a connection for telephone access via a modem, standard co-axial cable lines, high-speed T1 line, radio, infrared or other wireless communication methodologies (e.g., "Bluetooth," infrared (IR), etc.), private or proprietary local area networks (LANs) and wide area networks (WANs), as well as standard computer network communications over Internet 195 or an internal network (e.g. "intranet") via a wired or wireless connection, or any other suitable connection between computers and computer components known to those skilled in the art, whether currently known or developed in the future. It should be noted that portions of network 120 might suitably include a dial-up phone connection, a broadcast cable transmission line, a Digital Subscriber Line (DSL), an ISDN line, or similar public utility-like access link.

In the most preferred embodiments of the present invention, at least a portion of network 120 comprises a standard Internet connection 185 between at least some of the components of computer-based system for providing a personalized communication network 100 for providing access to additional network resources and other remote locations. Network 120 provides for communication between the various components of computer-based system for providing a personalized communication network 100 and allows for relevant information to be transmitted from device to device. In this fashion, a user of computer-based system for providing a personalized communication network 100 can quickly and easily gain access to the relevant data and information utilized to search, retrieve, and display information from one or more databases as described in conjunction with the preferred embodiments of the present invention.

In the most preferred embodiments of the present invention, network 120 is configured to provide relatively high-speed transmission of textual information, audio and video data and signals, and also comprises at least an Internet connection 185 for transmission of data captured by one or more computers 170 or 180 and a phone 160 for transmission of an audio signal to and from a standard phone connection. The phone connection may be interfaced to a standard phone system typically found in most homes and commercial facilities, including for example, the existing "land line" phone system infrastructure and/or digital cellular phone communication systems.

In addition to the other components shown in FIG. 1, a wireless communication access device 175 may optionally be communicatively coupled to network 120 and represents any type of wireless communication mechanism that is known to those skilled in the art to provide for wireless communication between network 120 and the various devices associated with network 120, including desktop computer 170, laptop computer 180 and phone 160 as well as mobile communication device 190. The most preferred embodiments of an acceptable wireless communication access device may comprise any type of wireless bridge, wireless router, or wi-fi "hotspot."

Regardless of the specific components, physical nature, and topology, network 120 serves to logically and communicatively link the physical components of computer-based system for providing a personalized communication network 100, thereby enabling stable and consistent communication between the components. This is especially important because in many preferred embodiments of the present invention, data server 130, desktop computer 170, and laptop computer 180 may be geographically remote and/or physically separated from each other.

Data server 130 represents a relatively powerful computer system that is made available to desktop computer 170, laptop computer 180, and/or mobile communication device 190 via network 120. In the most preferred embodiments of the present invention, data server 130 is operated as a messaging intermediary or message "clearing house" to process messages for message originators and message recipients. While message originators and message recipients have access to data server 130, data server 130 is operated and controlled by a third party in order to shield the personal contact data of the message recipients from the message originators. Various hardware components (not shown this FIG.) such as external monitors, keyboards, mice, tablets, hard disk drives, recordable CD-ROM/DVD drives, jukeboxes, fax servers, magnetic tapes, and other devices known to those skilled in the art may be used in conjunction with data server 130. Data server 130 may also provide various additional software components (not shown this FIG.) such as database servers, web servers, firewalls, security software, and the like. The use of these various hardware and software components is well known to those skilled in the art.

Given the relative advances in the state-of-the-art computer systems available today, it is anticipated that functions of data server 130 may be provided by many standard, readily available data servers. This may also include the deployment of multiple inter-connected and redundant data servers 130 to enhance the availability and reliability of the functions provided by data server 130. Depending on the desired size and relative power required for data server 130, storage area network (SAN) technology may also be deployed in certain preferred embodiments of the present invention. Additionally, various biometric and identification verification devices for identifying users and controlling access as well as creating and verifying digital signatures (i.e., electronic signature processing) may also be included.

Desktop computer 170 may be any type of computer system known to those skilled in the art that is capable of being configured for use with computer-based system for providing a personalized communication network 100 as described herein. It should be noted that no specific operating system or hardware platform is excluded and it is anticipated that many different hardware and software platforms may be configured to create computer 170. As previously explained in conjunction with data server 130, various hardware components and software components (not shown this FIG.) known to those skilled in the art may be used in conjunction with computer 170. It should be noted that in the most preferred embodiments of the present invention, desktop computer 170 is linked (via wired or wireless connection) to its own LAN or WAN and has access to one or more additional data servers (not shown this FIG.).

In addition as shown in FIG. 1, a telephone 160 may be used in conjunction with computer 170 to allow audio messages and alerts to be communicated to telephone 160. In this embodiment, telephone 160 has been communicatively coupled to or otherwise interfaced with the standard telephone communication infrastructure associated with one or more users of computer-based system for providing a personalized communication network 100. Similarly, audio messages and various other communications and alerts may be communicated to mobile communication device 190 or other personal electronic device.

Similarly, laptop computer 180 may be any type of relatively lightweight portable computer system known to those skilled in the art that is capable of being configured for use with computer-based system for providing a personalized communication network 100 as described herein. This includes tablet computers (e.g., iPad®), pen-based computers and the like. Computer 180 may also be configured to allow the transmission and reception of audio signals, messages, communications, and various types of alerts via server 130 and network 120.

Additionally, netbooks, tablets, handheld and palmtop devices are also specifically included within the description of devices that may be deployed as a laptop computer 180. It should be noted that no specific operating system or hardware platform is excluded and it is anticipated that many different hardware and software platforms may be configured to create laptop computer 180. As previously explained in conjunction with data server 130, various hardware and software components (not shown this FIG.) known to those skilled in the art may be used in conjunction with laptop computer 180. It should also be noted that in the most preferred embodiments of the present invention, laptop computer 180 is linked to its own LAN or WAN and has access to its own data server (not shown this FIG.).

In general, the communication between devices associated with data server 130 will be data associated with creating and delivering messages in the most efficient and desirable manner possible, based on user preferences and priorities. The users of desktop computer 170 and/or laptop computer 180 may be program administrators, managers, teachers, community members, parents and students who are seeking to access the most relevant and valuable communication fees from the various available communication messages. Additionally, various related entities such as local and regional governments, commercial enterprises, municipalities, and their employers and agents may also have access to one or more databases located on data server 130 via desktop computer 170 and/or laptop computer 180.

It should be noted that while FIG. 1 shows only a single desktop computer 170 and a single laptop computer 180, it is anticipated that the most preferred embodiments of the present invention will comprise dozens or even hundreds of computers 170 and laptop computers 180. Each of these computers 170 and 180 will be configured to access data server 130 in an appropriately secure way so as to accomplish the specific objectives of the user of the desktop computer 170 or laptop computer 180.

For example, the service provider that controls the databases stored on data server 130 may utilize desktop computer 170 or laptop computer 180 or mobile communication device 190 to access data server 130 and create, update or otherwise modify a given database. An operator, located in a remote location, may use desktop computer 170 or laptop computer 180 to access data server 130 to retrieve information about the participants or persons and the various messages being created and delivered by the users of computer-based system for providing a personalized communication network 100.

In the most preferred embodiments of the present invention, multiple desktop computers 170 and multiple laptop computers 180 will all be configured to communicate simultaneously with data server 130 and with each other via network 120. In addition, the most preferred embodiments of the present invention include a Software as a Service (SAAS) or Platform as a Service (PAAS) environment where data server 130 may be operated as a message clearinghouse in a hosted operation. In this fashion, multiple desktop computers 170 and laptop computers 180 will have access to data server 130 and the databases stored thereon via a global computer network such as Internet 195. Data server 130 is further described below in conjunction with FIG. 2 below.

An optional printer and an optional fax machine (not shown this FIG.) may also be deployed for various hard copy data output requirements and may be considered to be any standard peripheral devices used for transmitting or outputting paper-based version of messages (e.g., photographs, documents, notes, transaction details, reports, etc.) in conjunction with the various requests and transactions processed by computer-based system for providing a personalized communication network 100 (e.g., reports, communications, statistical analyses, automated letters, etc.). Finally, it should be noted that the optional printer and the optional fax machine are merely representative of the many types of peripherals that may be utilized in conjunction with computer-based system for providing a personalized communication network 100. It is anticipated that other similar peripheral devices will be deployed in the various preferred embodiment of the present invention and no such device is excluded by its omission in FIG. 1.

Mobile communication device 190 is representative of any type of wi-fi or Internet enabled mobile communication device or telephone that may be communicatively coupled to computer-based system for providing a personalized communication network 100. This includes, for example, personal digital assistants ("PDAs"), Windows® mobile phone devices, Android® OS devices, Palm® OS devices, Pocket PC® devices, the Apple® iPod Touch®, the Apple® iPhone® and other various types of smartphones and portable communication devices. Those skilled in the art will recognize these various devices and others that are suitable for deployment as mobile communication device 190. While somewhat less powerful than computers 170 and 180, mobile communication device 190 may also be configured to wirelessly communicate with data server 130 via network 120 to send and receive messages to and from data server 130.

Given the standard functionality for devices that may be deployed as mobile communication device 190, this communication be provided by a wireless Internet connection (e.g. "wi-fi" or "wi-max") or a Bluetooth® connection. One example of the use for mobile communication device 190 in the context of computer-based system for providing a personalized communication network 100 would to send messages or alerts to a parent of a student, alerting the parent of important information regarding the educational community and surrounding activities. Additionally, by scheduling and prioritizing messages, end users can control the timing for delivery of messages to increase the likelihood of the messages being delivered to the appropriate person, at the appropriate time, via the appropriate communication platform. Similarly, a business could deliver messages or alerts to customers, alerting the customers about special deals, discounts, etc. A municipal government could send messages or alerts to residents of their community, alerting the residents of important information regarding community activities, Amber Alerts, storm warnings, etc.

Those skilled in the art will recognize that FIG. 1 depicts a fairly standard "client/server" type communication arrangement where data server 130 is considered to be a server and computers 170 and 180 are considered to be clients of data server 130. Additionally, those skilled in the art will recognize that the functionality of data server 130 may be deployed on either of computers systems 170 and 180 in a more traditional "stand-alone" environment. In either case, the methods of the present invention are designed to minimize the amount of data that needs to be transferred from a database to the user of computer-based system for providing a personalized communication network 100.

Figure 2:
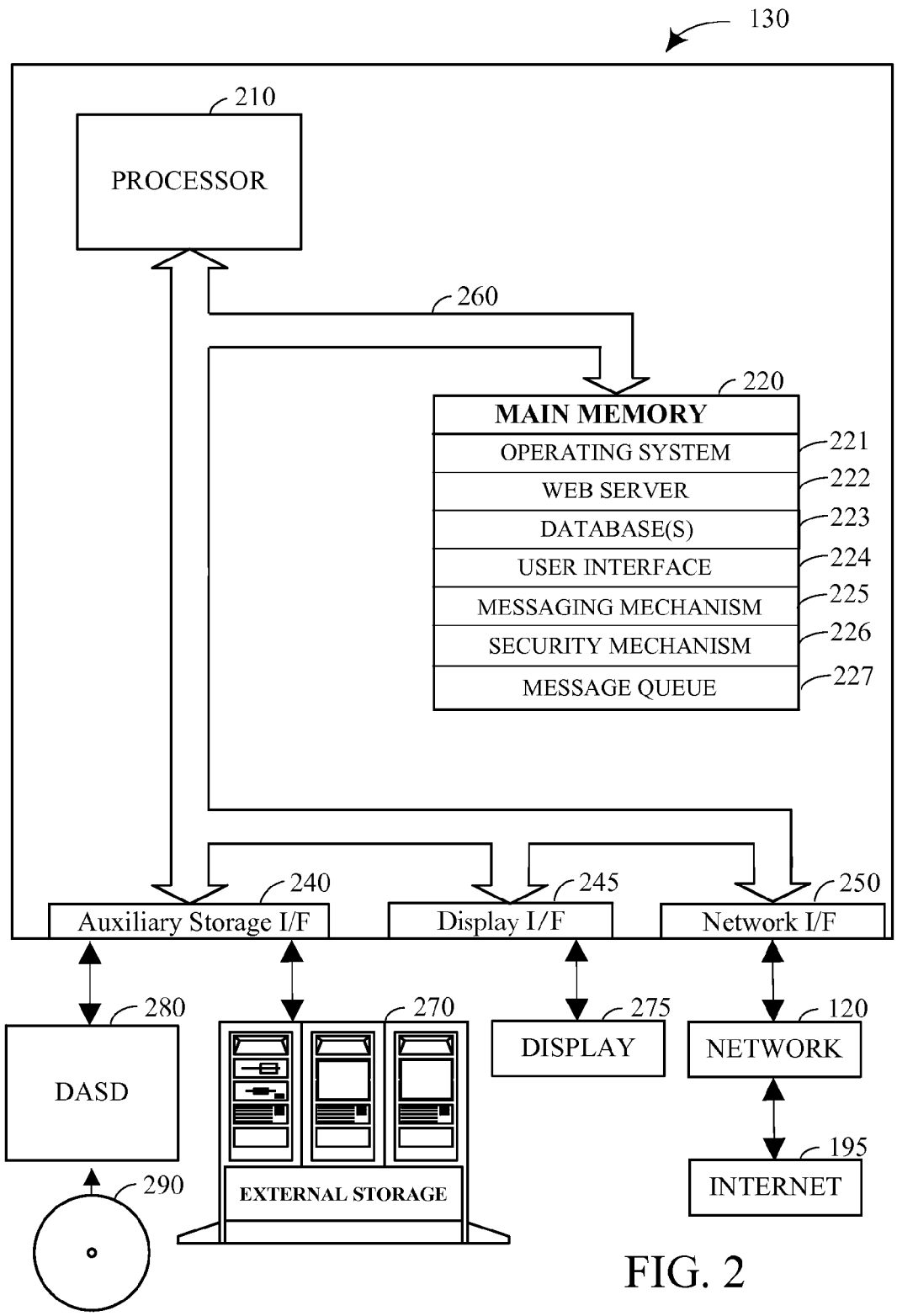
FIG. 2 is a block diagram of a server (computer) used for providing a personalized communication network in accordance with a preferred exemplary embodiment of the present invention.

Referring now to FIG. 2, data server 130 of FIG. 1 in accordance with a preferred embodiment of the present invention represents one of many commercially available computer systems such as a Linux®-based computer system, an IBM® compatible computer system, or a Macintosh® computer system. However, those skilled in the art will appreciate that the methods and system of the present invention apply equally to any computer system, regardless of the specific operating system and regardless of whether the computer system is a more traditional "mainframe" computer, a complicated multi-user computing device or a single user device such as a personal computer or workstation.

Data server 130 suitably comprises at least one Central Processing Unit (CPU) or processor 210, an auxiliary storage interface 240, a display interface 245, and a network interface 250, all of which are interconnected via a system bus 260. Note that various modifications, additions, or deletions may be made to data server 130 illustrated in FIG. 2 within the scope of the present invention such as the addition of cache memory or other peripheral devices. FIG. 2 is not intended to be exhaustive, but is presented to simply illustrate some of the more salient features of data server 130.

Processor 210 performs computation and control functions of data server 130, and most preferably comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor or CPU. Processor 210 is configured to execute one or more software programs contained within main memory 220. Although data server 130 depicted in FIG. 2 contains only a single main processor 210 and a single system bus 260, it should be understood that the present invention applies equally to computer systems having multiple processors and multiple system buses. Similarly, although system bus 260 of the preferred embodiment is a typical hardwired, multi-drop bus, any connection means that supports bi-directional communication in a computer-related environment could be used.

Auxiliary storage interface 240 allows data server 130 to store and retrieve information from auxiliary storage devices, such as external storage mechanism 270, magnetic disk drives (e.g., hard disks or floppy diskettes) or optical storage devices (e.g., CD-ROM). One suitable storage device is a direct access storage device (DASD) 280. As shown in FIG. 2, DASD 280 may be a DVD or CD-ROM drive that may read programs and data from a non-volatile DVD or CD disk 290.

Display interface 245 is used to directly connect one or more displays 275 to data server 130. Displays 275, which may be non-intelligent displays (e.g., "dumb") terminals or fully programmable workstations, are used to provide system administrators and users the ability to communicate with data server 130. Note, however, that while display interface 245 is provided to support communication with one or more displays 275, computer data server 130 does not necessarily require a display 275, because all needed interaction with users and other processes may occur via network 120. Additionally, in certain preferred embodiments, data server 130 may have an integrated display 275.

Network interface 250 is used to connect data server 130 to network 120 and computer-based system for providing a personalized communication network 100, including computer 170 and computer 180 of FIG. 1. Network interface 250 broadly represents any suitable way to interconnect electronic devices, regardless of whether the network comprises present day analog and/or digital techniques or via some networking mechanism of the future. Network interface 250 preferably includes a combination of hardware and software that allows communications on network 120.

Software provided in conjunction network interface 250 preferably includes a communication manager that manages communication with other computer systems or other network devices via network 120 using a suitable network protocol. Many different network protocols can be used to implement a network. These protocols are specialized computer programs that allow computers to communicate across a network. TCP/IP (Transmission Control Protocol/Internet Protocol) is just one example of a suitable network protocol that may be used by the communication manager contained within network interface 250.

It is important to note that while the present invention has been (and will continue to be) described in the context of a fully functional computer system with certain application software, those skilled in the art will appreciate that the various software mechanisms of the present invention are capable of being distributed as a program product in conjunction with an article of manufacture comprising software stored on a computer readable storage medium in a variety of forms, and that the various preferred embodiments of the present invention applies equally regardless of the particular type or storage medium used to actually carry out the distribution. Examples of computer readable storage media include: non-volatile and non-transitory recordable type media such as DVD and CD ROMS disks (e.g., disk 290), and transmission type media such as digital and analog communication links, including wireless communication links.

Main memory 220 suitably contains an operating system 221, a web server 222, one or more databases 223, a user interface 224, a messaging mechanism 225, a security mechanism 226, and a message queue 227. The term "memory" as used herein refers to any storage location in the virtual memory space of data server 130.

It should be understood that main memory 220 might not necessarily contain all parts of all components shown. For example, portions of operating system 221 may be loaded into an instruction cache (not shown) for processor 210 to execute, while other files may well be stored on magnetic or optical disk storage devices (not shown). In addition, although database 223 is shown to reside in the same memory location as operating system 221, it is to be understood that main memory 220 may consist of multiple disparate memory locations. It should also be noted that any and all of the individual software mechanisms or components shown in main memory 220 might be combined in various forms and distributed as a stand-alone program product. Finally, it should be noted that additional software components, not shown in this figure, might also be included.

Operating system 221 includes the software that is used to operate and control data server 130. In general, processor 210 typically executes operating system 221. Operating system 221 may be a single program or, alternatively, a collection of multiple programs that act in concert to perform the functions of an operating system. Any operating system now known to those skilled in the art or later developed may be considered for inclusion with the various preferred embodiments of the present invention.

Web server 222 may be any web server application currently known or later developed for communicating with web clients over a network such as the Internet. Examples of suitable web servers 222 include Apache web servers, Linux web servers, and the like. Additionally, other vendors have developed or will develop web servers that will be suitable for use with the various preferred embodiments of the present invention. Finally, while depicted as a single device, in certain preferred embodiments of the present invention web server 222 may be implemented as a cluster of multiple web servers, with separate and possibly redundant hardware (e.g., load balancers) and software systems. This configuration provides additional robustness for system uptime and reliability purposes. Regardless of the specific form of implementation, Web server 222 provides access, including a user interface, to allow individuals and entities to interact with graphical user interface 224, including via network 120 of FIG. 1.

Database 223 is representative of any suitable database known to those skilled in the art. In the most preferred embodiments of the present invention, database 223 is a Structured Query Language (SQL) compatible database file capable of storing information relative to various items that may be of interest to the users of computer-based system for providing a personalized communication network 100 of FIG. 1. In the most preferred embodiments of the present invention, database 223 will comprise a plurality of information that may be useful to an organization or individual that wants to provide communication messages for consumption by one or more message recipients, in conjunction with a preferred embodiment of computer-based system for providing a personalized communication network 100 of FIG. 1.

Graphical user interface 224 is a software component that provides the users of computer-based system for providing a personalized communication network 100 of FIG. 1 a means for interacting with the various components of computer-based system for providing a personalized communication network. In at least some of the most preferred embodiments of the present invention, graphical user interface 224 is a web browser based interface, accessible to the users of computer-based system for providing a personalized communication network services via any standard web browser from any computer that is connected to the Internet. Additional details on graphical user interface 224 are presented below.

Additionally, at least one preferred embodiment of the present invention comprises a graphical user interface deployed on a mobile communication device 190. In this embodiment, a graphical user interface may be offered via an "app" customized for mobile communication device 190 or via a web browser based interface provide via a connection to data server 130, allowing the user of mobile communication device 190 to access messaging mechanism 225 and database 223. In either case, the consumer of the aggregated communication messages provided by data server 130 will be accessible and customizable via the graphical user interface provided in conjunction with mobile communication device 190.

In at least one preferred embodiment of the present invention for a personalized communication network in an educational environment, database 223 of FIG. 2 will typically include a plurality of database records containing information about multiple schools and students (e.g., school location, student names, grades, dates and times of attendance, etc.) as well as information about teachers and parents (e.g., names and addresses, contact information, employment information, family information, etc.), and entries which are defined as specific situation/circumstances for various performance and event applications (e.g., club, sports, or other extracurricular participation data for identifying relevant messages for a student or group of students) as well as information providing for tracking, analyzing and reporting information about message originators, message recipients, the number and quantity of messages created and sent. This information may be provided to interested and authorized users of computer-based system for providing a personalized communication network 100 of FIG. 1.

Additionally, database 223 of FIG. 2 will typically include a plurality of database records containing information about multiple businesses in the community (e.g., grocery stores, variety stores, service stations, lawyer and doctor offices, etc.) as well as information about residents in the community (e.g., names and addresses, contact information, employment information, family information, etc.), and entries which are defined as specific situation/circumstances for various community events (e.g., holidays, special performances, etc.) as well as information providing for tracking, analyzing and reporting information about message originators, message recipients, the number and quantity of messages created and sent. This information may be provided to interested and authorized users of computer-based system for providing a personalized communication network 100 of FIG. 1.

Database 223 will also store user profiles (e.g., message originator profiles, message recipient profiles, organization profiles, etc.) containing detailed information about each user or group of users, including user communication preferences, phone numbers, email addresses, message delivery preferences, schedules, and prioritization, permissions, home and work addresses, etc. In this fashion, a message originator with appropriate access may interact with a third party intermediary to use the information contained in database 223 to quickly and easily create multiple messages for delivery to one or more message recipients, even when the message originator does not have direct access to the contact information contained in database 223.

Those skilled in the art will recognize that other types of information for other types of data that may be used in other applications (e.g., historical, informational, technical, etc.) may be stored and retrieved as well. While database 223 is shown to be residing in main memory 220, it should be noted that database 223 might also be physically stored in a location other than main memory 220. For example, database 223 may be stored on external storage device 270 or DASD 280 and coupled to data server 130 via auxiliary storage I/F 240. Additionally, while shown as a single database 223, those skilled in the art will recognize the database 223 may actually comprise a series of related databases, logically linked together. Depending on the specific application and design parameters, database 223 may take many different forms when implemented.

The most preferred embodiments of computer-based system for providing a personalized communication network 100 of FIG. 1 will include a messaging mechanism 225 in main memory 220. Messaging mechanism 225 will generally comprise a series of task oriented (e.g., message assembly, message scheduling, etc.) routines. Messaging mechanism 225 is an automated programmable system that is capable of assisting message originators and message recipients with the various tasks associated with generating one or more messages or message events, by gathering, monitoring and using the information stored in database 223 by users of system 100.

In the most preferred embodiments of the present invention, messaging mechanism 225 will be configured to manage and coordinate the delivery of messages from message originators to message recipients via message queue 227. This includes email messages, tweets, audio and video data, RSS fees, and/or SMS text messages to message recipient's computers, telephones, cell phones or other mobile communication devices such as mobile communication device 190 of FIG. 1. Messaging mechanism 225 may also be used to generate hard copy messages (e.g., mail merge letters, greeting cards, memos, etc.) that are then sent via standard U.S. Postal Service or some type of commercial message delivery company.

Additionally, messaging mechanism 225 may be configured to identify the appropriate contact information for one or more message recipients and send messages to the message recipients based on the instructions received from the message originator as well as the information about the message recipient stored in database 223. This is important because, in the most preferred embodiments of the present invention, the message originator will not have access to the contact information for the message recipients and will simply identify the message recipients and messaging mechanism 225 will be responsible to identify the appropriate communication platform and deliver the message to the appropriate message recipients at the appropriate time.

Although multiple delivery options will be provided to the message originator, in the most preferred embodiments of the present invention, messaging mechanism 225 is configured to deliver messages based on the preferences of the message recipient as well as the instructions specified by the message originator. Each message recipient, as an authorized user of computer-based system 100, will have one or more accounts and their account information will be stored in database 223 of FIG. 2. It should be noted that the output from messaging mechanism 225 might be determined based on preferences maintained in conjunction with each message recipient's account. Each message recipient may specify their preference for message and content delivery preferences via user interface 224.

For example, if a message recipient prefers to receive a message via email, then messaging mechanism 225 will store the message in message queue 227 for delivery to the message recipient via email. Alternatively, a visually impaired person may request that their messages be delivered via an audio format. By using various text to speech conversion technologies, their messages will be converted to an audio signal and delivered via telephone 160 of FIG. 1 or as an audio stream delivered via an application on mobile communication device 190 of FIG. 1 or as an audio file attached to an email.

In other situations, a message comprising a combination of audio, video, textual and other formats may be delivered to a message recipient. Additionally, each message recipient will be able to specify which types of devices are available to the message originator and the most preferred delivery methodologies, priorities, and times for message delivery via various communication platforms. The message recipient can select the desired communication or message platform and set a prioritization schedule for message delivery to one or more devices. Additionally, if a message originator selects multiple delivery options, one or more of the specified options may not be available to all intended message recipients and messaging mechanism 225 will select an available option for delivery. For example, if a message contains material that is incompatible with the message recipient's available devices (e.g., a multi-media file in a message delivered to a feature phone), the incompatible content may be excluded from the message or an alternative device may be selected from the group of available devices associated with the message recipient's profile contained in database 223.

Messaging mechanism 225 can also send push notifications to third party servers, such as the Apple Push Notification Service or Google Cloud Messaging for Android, which then delivers push notifications to smart phones using server-push technology in which a communication between a computerized message delivery service and a user alert is initiated by the message delivery service rather than the user. This will alert the message recipient that a new message is waiting.

Messages may also be translated from one language into another so that message recipients can view the message in a language other than the default language. For example, messaging mechanism 225 retrieves the language setting of the message recipient's mobile device through an HTTP request header and uses the language of the language setting as the target language, or if the message recipient has selected a language within the settings of their user profile in database 223, then messaging mechanism 225 uses the language which the message recipient selected in the user profile as the target language instead of the language setting of the message recipient's mobile device.

In some preferred embodiments of the present invention, computer-based system 100 uses an application program interface ("API") to request information from and send information to third party service providers. This allows messaging mechanism 225 to access services such as LinkedIn®, Facebook®, and Twitter® to deliver messages to the user accounts for message recipients that have selected these communication platforms.

Additionally, messaging mechanism 225 and message queue 227 may be configured to generate a facsimile message by utilizing a fax server and a facsimile modem (not shown this FIG.) that is deployed in conjunction with data server 130 of FIG. 2. Messaging mechanism 225 is also capable of being configured and used to send and receive various electronic status messages (e.g. audio and video alerts) and updates to data server 130 and between computers 170, 180, and/or mobile communication device 190 of FIG. 1, as may be necessary to enhance the overall process of completing activities related to the provision of a personalized communication network services as described herein.

In the most preferred embodiments of the present invention, messaging mechanism 225 is configured to generate and transmit a plurality of messages with each message containing multiple discrete elements. For example, each message may contain text, PDF and .JPG attachments, audio-video segments, audio clips generated by an automated text-to-speech computer program, contemporaneously recorded audio clips that are unique to a specific message, etc. Additionally, dynamic audio clips, using elements extracted from database 223, that are associated with a specific individual, may also be used for a personalized communication network. For example, a generic introduction or greeting from the mayor, business owner, supervisor or teacher associated with a specific individual may be included, a facility identifier (e.g., city office, school, factory, or office building location associated with the at least one individual), as well as the purpose for inclusion of the specific content in the message (e.g. expression of concern, encouraging message, etc.).

Further, in the most preferred embodiments of the present invention, messaging mechanism 225 will most preferably be configured with one or more message duplication filters that will provide for the reduction or elimination of duplicate messages.

In addition, the most preferred embodiments of the present invention comprise security mechanism 226 for verifying access to the data and information contained in and transmitted to and from data server 130. Security mechanism 226 may be incorporated into operating system 221 and/or web server 222. Additionally, security mechanism 226 may also provide encryption capabilities for other components of computer-based system for providing a personalized communication network 100 of FIG. 1, thereby enhancing the robustness of computer-based system for providing a personalized communication network 100 of FIG. 1. Security mechanism 226 is most preferably configured to protect the integrity and security of the information and messages transmitted via network 120 of FIG. 1.

Further, depending on the type and quantity of information stored in database 223 and accessed by graphical user interface 224, security mechanism 226 may provide different levels of security and/or encryption for different computer systems 170 and 180 of FIG. 1 and the information stored in database 223. The level and type of security measures applied by security mechanism 226 may be determined by the identity of the message recipient and/or the nature of a given request and/or response. In some preferred embodiments of the present invention, security mechanism 226 may be contained in or implemented in conjunction with certain hardware components (not shown this FIG.) such as hardware-based firewalls, switches, dongles, and the like.

Message queue 227 is a specialized memory location that is configured to store messages for delivery to one or more specified message recipients, at a pre-determined time. Messages will be placed into message queue 227 by messaging mechanism 225. Since the creation of a message to be delivered at a later time by a message originator is a common feature of system 100, the order in which the messages were created or stored in database 223 may not always match the delivery schedule as determined by messaging mechanism 225.

In the most preferred embodiments of the present invention, the various components of computer-based system for providing a personalized communication network 100 of FIG. 1 are able to communicate using multiple communications protocols and systems (e.g., Voice over IP or "VoIP", email, SMS, RSS, Plain Old Telephone Service or "POTS", etc.). Those skilled in the art will recognize that the communication protocols used herein may be readily adapted and configured to allow for the rapid and efficient transmission and receipt of message by and between the various components of computer-based system for providing a personalized communication network. This would also include the ability to control and customize the input and output of computer-based system for providing a personalized communication network for integration with other systems. While a specific exemplary embodiment of a suitable server 130 has been provided above, those skilled in the art will recognize that many other suitable computers (with more or fewer features) may be substituted for the specific example provided herein within departing from the spirit and scope of the present invention.

Figure 3:
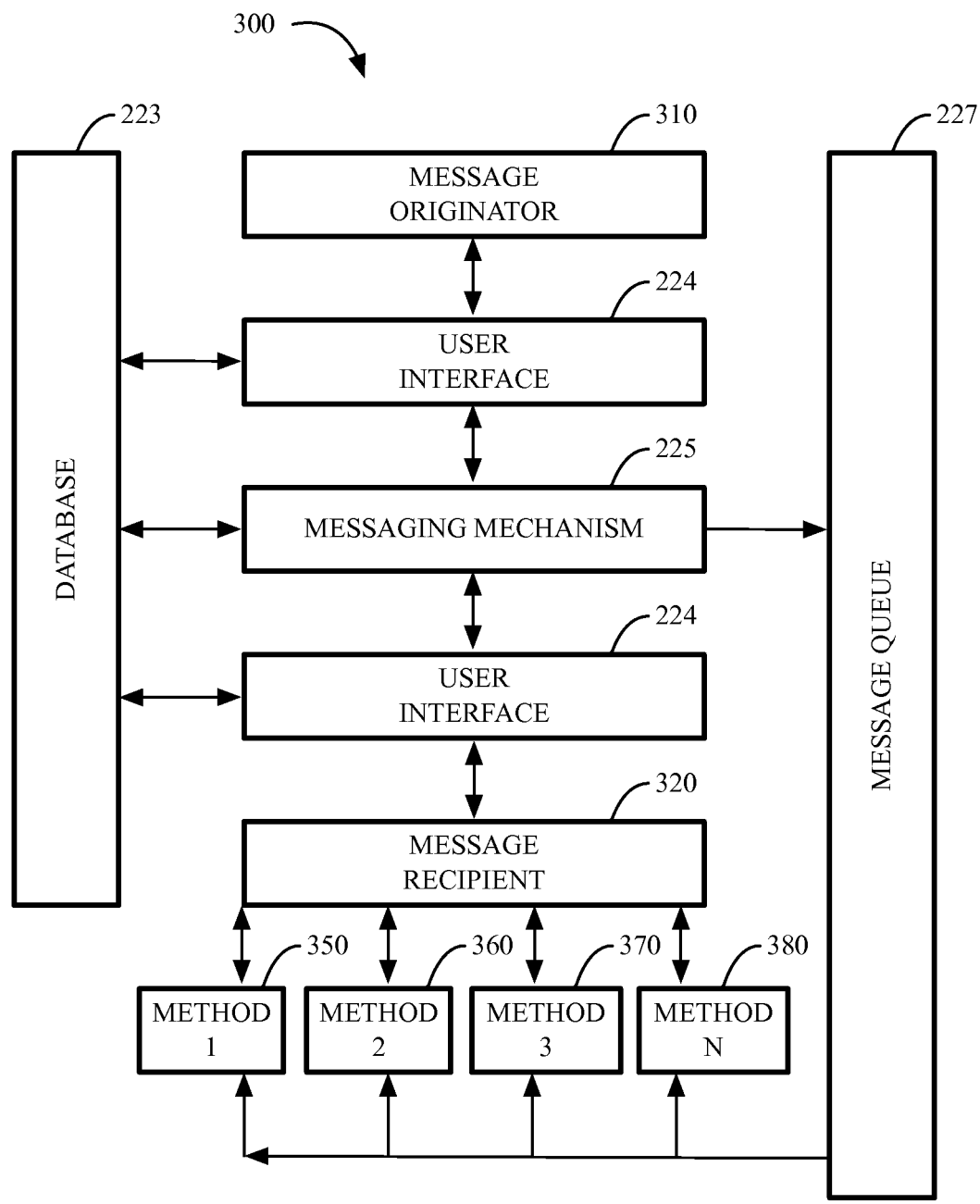
FIG. 3 is a block diagram illustrating the interactions of end users with a computer-based system for providing a personalized communication network in accordance with a preferred exemplary embodiment of the present invention.

Referring now to FIG. 3, a block diagram 300 depicting the interactions of message originators and message recipients with the computer-based system for providing a personalized communication network 100 of FIG. 1 is depicted. As shown in FIG. 3, a message originator 310 will interact with user interface 224. By accessing user interface 224, message originator 310 can input and modify the data contained in database(s) 223, including accessing database 223 to create and send one or more messages to message recipient 320. As previously explained, user interface 224 is configured to programmatically interact with messaging mechanism 225 and database 223 of FIG. 2, specifically for the purpose of processing the information necessary to transmit messages between message originator 310 and message recipient 320.

Similarly, message recipient 320 will interact with messaging mechanism 225 and database 223 via a user interface such as user interface 224. It is important to note that message originator 310 and message recipient 320 are both likely to switch roles during the communication process. For example, upon receiving a message from message originator 310, message recipient 320 may determine to prepare and send a response to message originator 310. In that case, message recipient 320 becomes the "message originator" and message originator 310 becomes the "message recipient."

Since each participant in a message exchange may be both a message originator and a message recipient, those skilled in the art will recognize that the descriptions of the preferred embodiment of the present invention as set forth herein may encompass multiple message recipients and multiple originators without regard to any limitation on specific numbers of participants in a message exchange.

Additionally, each message recipient 320 may have multiple devices that have been configured to receive messages from each message originator 310. Message originator 310, in order to ensure that message recipient 320 receives the messages, may opt to configure a message to be sent via multiple communication methods, such as method 350, method 360, method 370, and method 380. Each of method 350, method 360, method 370, and method 380 comprises a communication platform and associated device. For example, method 350 may comprise a message from message originator 310 that is delivered to a cell phone via a social networking platform using wi-fi. Method 360 may comprise a message from message originator 310 delivered to a cell phone via SMS. Method 370 may comprise an email message from message originator 310 delivered to a computer via the Internet. In the most preferred embodiments of the present invention, one or more redundancy filters will be applied to ensure that the delivery of duplicate messages is reduced or eliminated to the extent possible.

Figure 4:
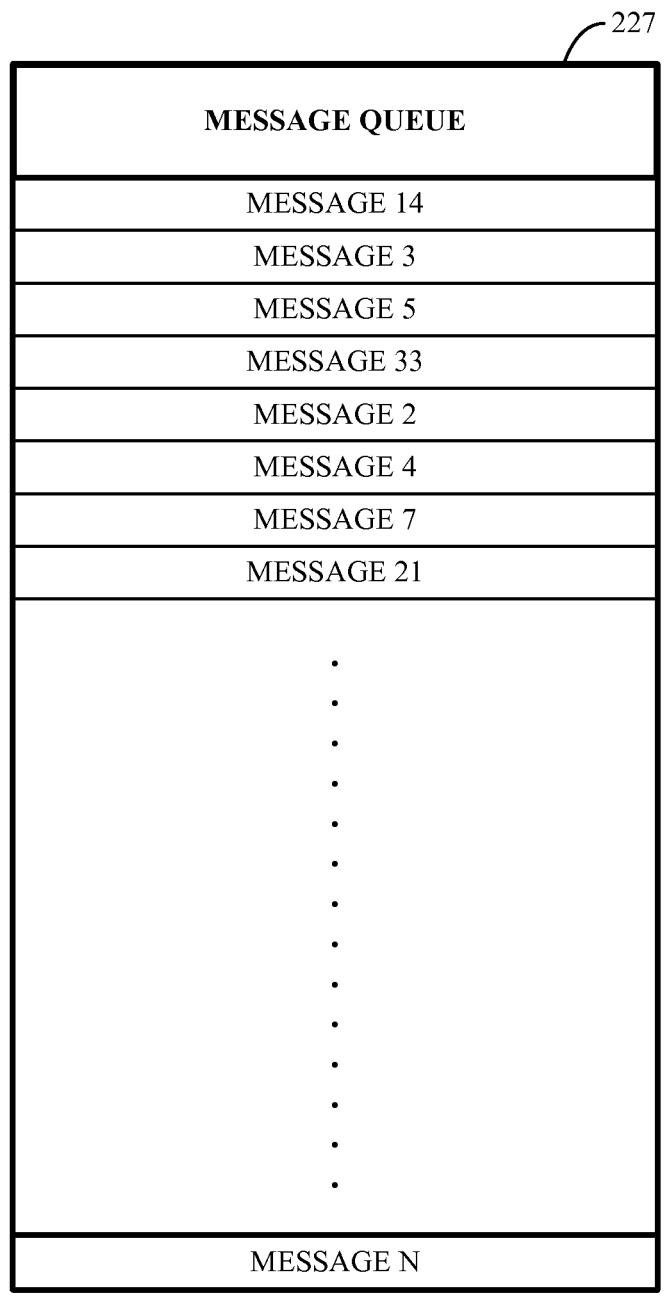
FIG. 4 is a block diagram of a message queue for use in conjunction with a computer-based system for providing a personalized communication network in accordance with a preferred exemplary embodiment of the present invention.

Referring now to FIG. 4, a block diagram of a plurality of messages stored in message queue 227 is depicted. As shown in FIG. 4, the messages are not necessarily stored in message queue 227 in the order in which they were created. Instead, message queue 227 is a dynamic message queue and the messages are typically positioned in the queue in the order in which they are to be sent to the selected message recipients. The exact timing for delivery of each message in message queue 227 will be determined by using the time specified by the message originator for delivery of the message.

It is important to note that a "delivery window" will be established by computer-based system for providing a personalized communication network 100 of FIG. 1. System 100 will store messages in message queue 227 and the time specified for delivery by the message originator will serve as the baseline for delivery. However, depending on a variety of factors, including the number of recipients, message or communication platform specified for delivery, etc., the actual delivery time may be programmatically adjusted by messaging mechanism 225 of FIG. 2. It is also important to note that while the message originator creates a single message and a delivery time for the message, the message originator may specify a different delivery time for each message recipient, depending on the message originator's preferences. Similarly, even with the same specified delivery time for multiple message recipients, each message recipient may receive their message at a different time, depending on their message receipt preferences.

Figure 4A:
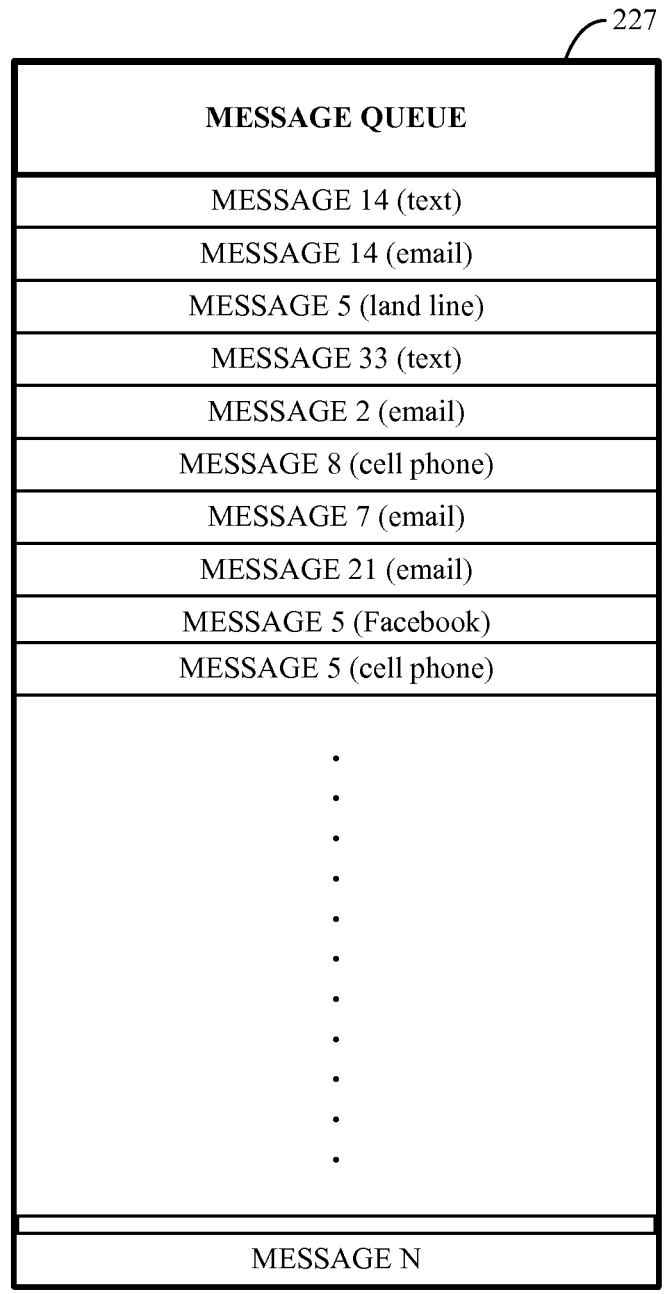
FIG. 4A is a block diagram of a message queue for use in conjunction with a computer-based system for providing a personalized communication network in accordance with an alternative preferred exemplary embodiment of the present invention.

Referring now to FIG. 4A, message queue 227 depicts the presence of multiple duplicate messages prior to processing in accordance with a preferred embodiment of the present invention. Message 14 is scheduled to be sent as a text message and as an email message. Message 5 is scheduled to be sent as a phone call to a landline, a Facebook® post, and as a phone call or message to a cell phone. In at least some cases, the multiple versions of the duplicate message may end up being sent to a person via all message platforms, leading to the delivery of duplicate messages.

Figure 5:
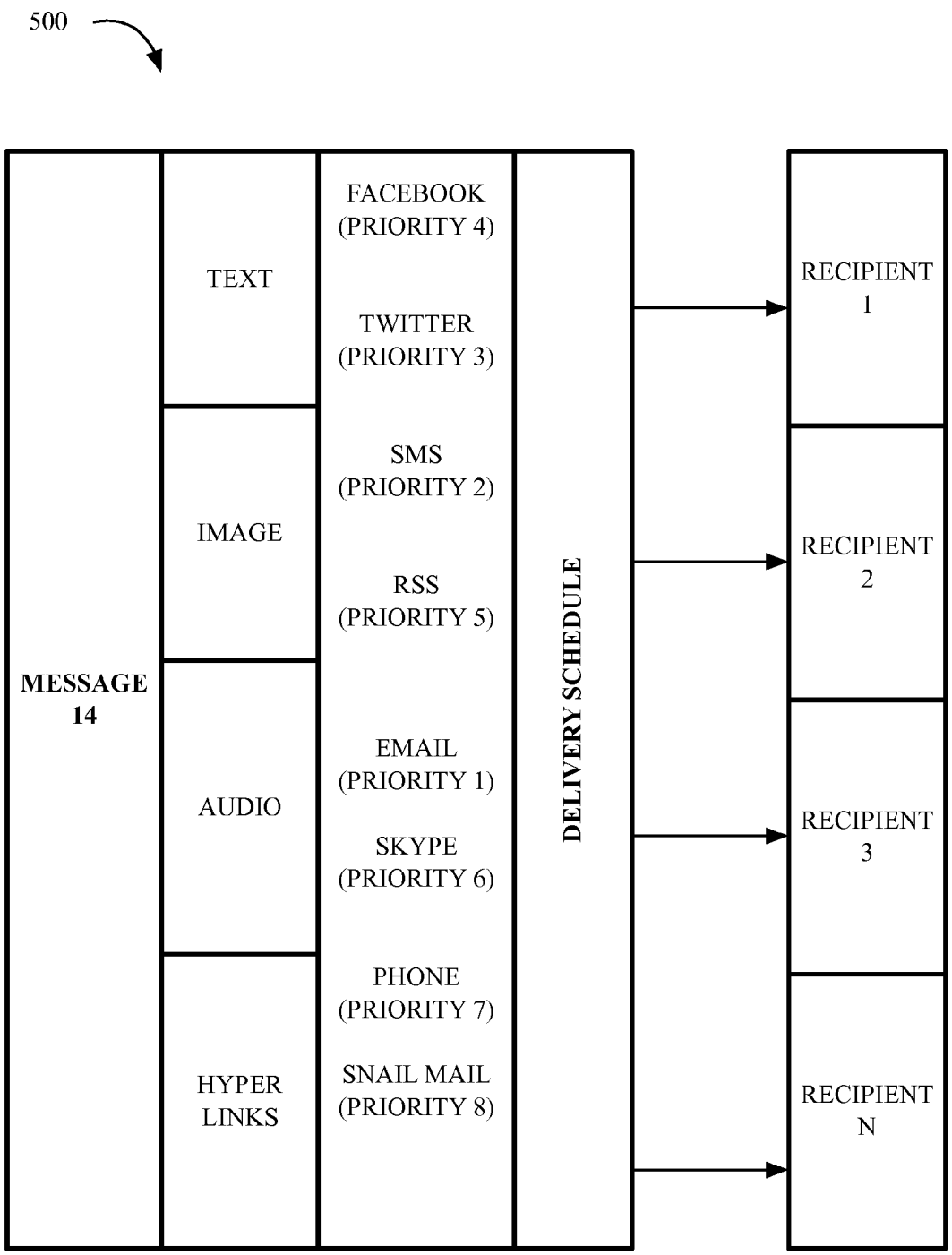
FIG. 5 is a block diagram of the message parameters for a message to be sent by a message originator using a computer-based system for providing a personalized communication network in accordance with a preferred exemplary embodiment of the present invention.

Referring now to FIG. 5, a block diagram 500 representing the various types of information associated with a message created by a message originator is depicted. As shown in FIG. 5, message 14 includes textual elements, graphic or image elements, audio elements, and hyperlinks to various types of content accessible via the Internet. In addition, in certain preferred embodiments of the present invention, the message originator may specify a desired order for delivery of message 14 to four message recipients. In this example, the message originator has specified eight different communication or message delivery options, and prioritized the various options.

In this example, the message originator has also indicated a delivery schedule. As previously noted, "message recipient" may refer to a single individual (e.g., "John Smith" or to a group of individuals (e.g., "Workers on the midnight shift"). User interface 224 of FIG. 2 can be used to specify the exact identity of the intended message recipient(s), even if the contact information for the message recipient(s) is not known by the message originator. Similarly, the user interface associated with mobile communication device 190 may be utilized to create and send messages, including selecting the desired message recipient(s) without knowing any contact information for any message recipient.

With this information, messaging mechanism 225 of FIG. 2 can programmatically devise a "best match" or "best fit" message delivery scenario by comparing the message receipt preferences of each message recipient and matching the message originator's messaging preferences for message delivery and each message recipient's messaging preferences for message receipt. In other situations, the message originator may simply send a message without including any delivery preferences and the message recipient's message receipt preferences will be the only factor considered and each message recipient will receive message 14 accordingly. Alternatively, messaging mechanism 225 may review the message recipient's messaging preferences and the message originator's messaging preferences and arbitrate the preferences to transmit the message using the most appropriate combination, once again without revealing any message recipient information to the message originator.

Figure 5A:
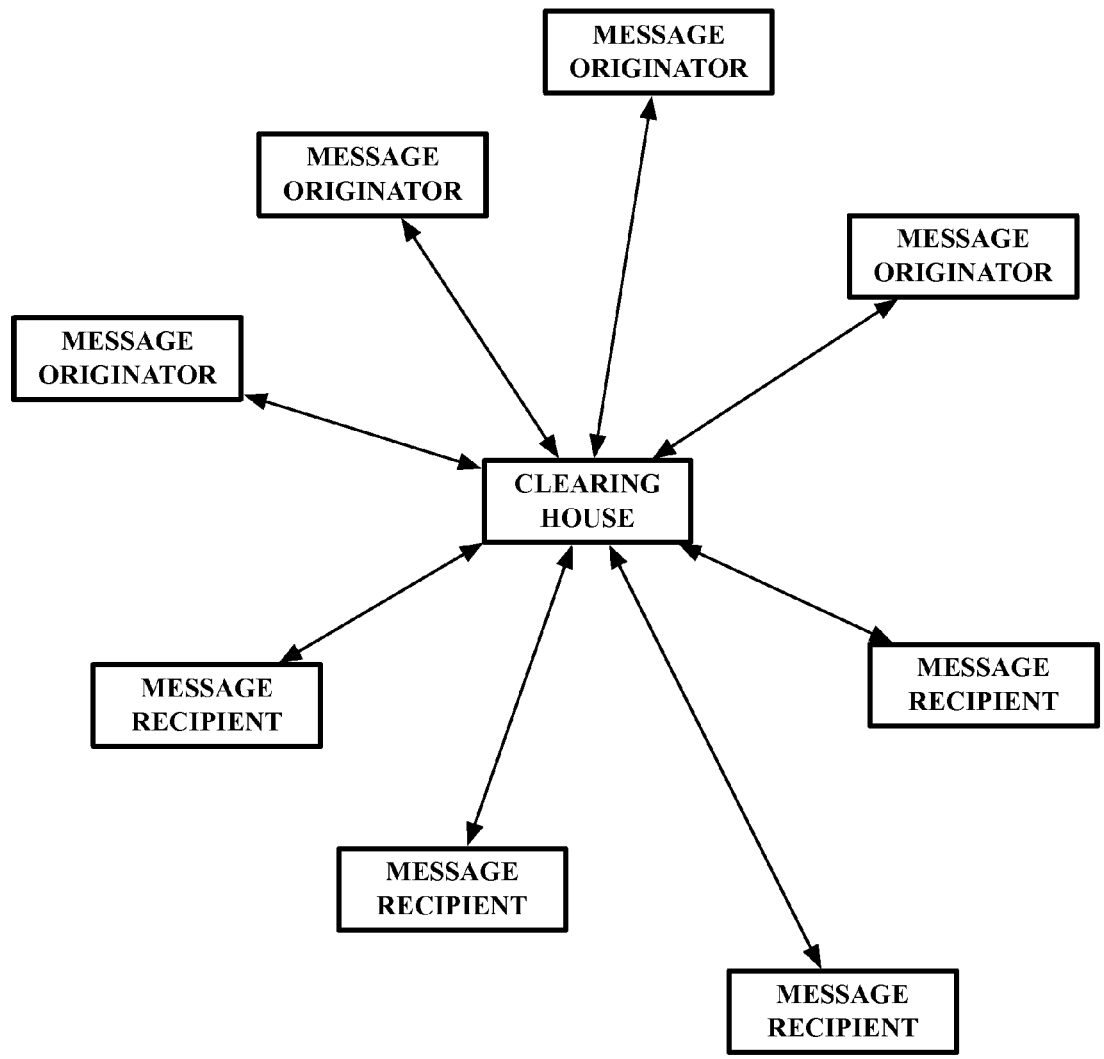
FIG. 5A is a block diagram for connecting message originators with message recipients for delivering messages using a computer-based system for providing a personalized communication network in accordance with a preferred exemplary embodiment of the present invention.

Referring now to FIG. 5A, a block diagram for connecting message originators with message recipients for delivering messages using a computer-based system for providing a personalized communication is depicted. As shown in FIG. 5A, the clearinghouse, using messaging mechanism 225 of FIG. 2, is the central communication mechanism for sending and receiving messages. As previously explained, the clearing house will provide access to data server 130 of FIG. 1 and FIG. 2 and indirect access to the contact information stored therein. Each message originator will specify the desired message recipients for a given message and transmit the message and the identities of the message recipients to the clearinghouse. The clearing house will then schedule and send the message to the designated message recipient(s) at the appointed time, using the appointed means as described herein.

Figure 6:
FIG. 6 is a block diagram of the schedule and prioritization for message delivery to two recipients for receipt of messages sent by a computer-based system for providing a personalized communication network in accordance with a preferred exemplary embodiment of the present invention.

Referring now to FIG. 6, a block diagram illustrating the message receipt options for recipient 1 and recipient 2 are depicted. As shown in FIG. 6, each recipient may specify various time frames for receiving messages as well as the preferred message or communication platform for receiving message for each specific time frame. Once again, the message originator may specify an "emergency" condition and override the message recipient's message receipt preferences.

As previously explained, the most preferred embodiments of the present invention allow multiple organizations or entities, as message originators, to contact one or more message recipients through a communication network where a third party clearinghouse maintains the message recipient's personal contact information where the personal contact information is not necessarily disclosed to the message originators. Messages are only shared with message recipients that have an established messaging relationship with the message originator. A messaging relationship may be established as a "critical" messaging relationship or a "non-critical" messaging relationship. An example of a "critical" messaging relationship would be the messaging relationship between a parent and the school where the parent has one or more children attending. Similarly, a "critical" messaging relationship may be a messaging relationship established between an employer and their employees. In like fashion, the relationship between a city or municipality and the residents may be deemed a "critical" messaging relationship.

The distinction of between "critical" messaging relationship vs. non-critical messaging relationship is important because in certain preferred embodiments of the present invention, a message from a message originator to a message recipient in a critical relationship may be configured to override the messaging preferences of the message recipient. For example, in an emergency situation, a school may send an urgent message to all message recipients via phone message and SMS message, even if the message recipient's preferences would normally allow for SMS messages only.

In general, for most preferred embodiments of the present invention, the default messaging relationship between message originator and message recipient will be non-critical and only governmental agencies and schools would be authorized to establish critical messaging relationships. However, other message originators and message recipients may mutually agree to establish a critical messaging relationship if they choose to do so.

Also, if an entity has contact information that doesn't match to any existing message recipient account on the personalized communication network, the message recipient account could be created and the entity could manage the message recipient account until it is claimed by the appropriate message recipient. Message recipients may claim a message recipient account and the associated messaging relationship by interacting with the messaging mechanism 225 through authentication of their contact information. Replying to, or clicking on a link identifying a messaging relationship in an email, Tweet® message, or Facebook® message may be one way of claiming a user account. Similarly, entering a code sent as a text or phone call, etc. may also be used to accomplish this purpose as well.

There are multiple ways that a messaging relationship between a message originator and a message recipient may be established. However, as previously mentioned, in all of the most preferred embodiments the personal contact information of the message recipients is not shared with the message originator unless a message recipient specifically "opts in" and agree to share the information with the message originator. If the relationship is a critical relationship then the entity may unilaterally create the relationship and corresponding communication network connection between the entity as a message originator and the message recipient. However, in certain cases, the message recipient may still be allowed to configure the message preferences so that the message originator cannot send message to the user or access the message recipient's contact information without the message recipient's express approval.

Each message recipient may specify the preferred type, frequency, and mode of messaging to be received from the message originator. In general, the message recipient maintains control of the nature of the relationship and how contacts are made. If the relationship is a non-critical relationship, such as a message recipient who has agreed to receive marketing or other messages from a restaurant, then the message recipient can control the nature of the contact between the restaurant and the message recipient.

In some preferred embodiments of the present invention, message recipients download a single app to their smart phone or other mobile communication device (the "Master App") and the message recipients may then grant permission to different message originators to contact the message recipient through the Master App. For example, a message recipient could download an app called "Community Relationship" which would serve as a personal communication network wherein multiple message originators could create a profile and the message recipient could choose to "follow" those profiles and receive notifications.

In other preferred embodiments of the present invention, the message recipient may download separate apps that all store their information on a single network but appear as separate icons for a series of discrete apps on a mobile device. In this embodiment, once the message recipient had downloaded and provided personal contact information to one app within the network, future downloads of apps within the personal communication network will prompt the message recipient to decide whether or not they want to be contacted by other message originators sharing the personal communication network. In this manner, the message recipient could quickly and easily configure the various apps to receive messages from any person, entity, or organization registered as a message originator on the communication network. As previously explained, the message recipient will have the ability to customize the message delivery in accordance with their preferences.

Figure 7:
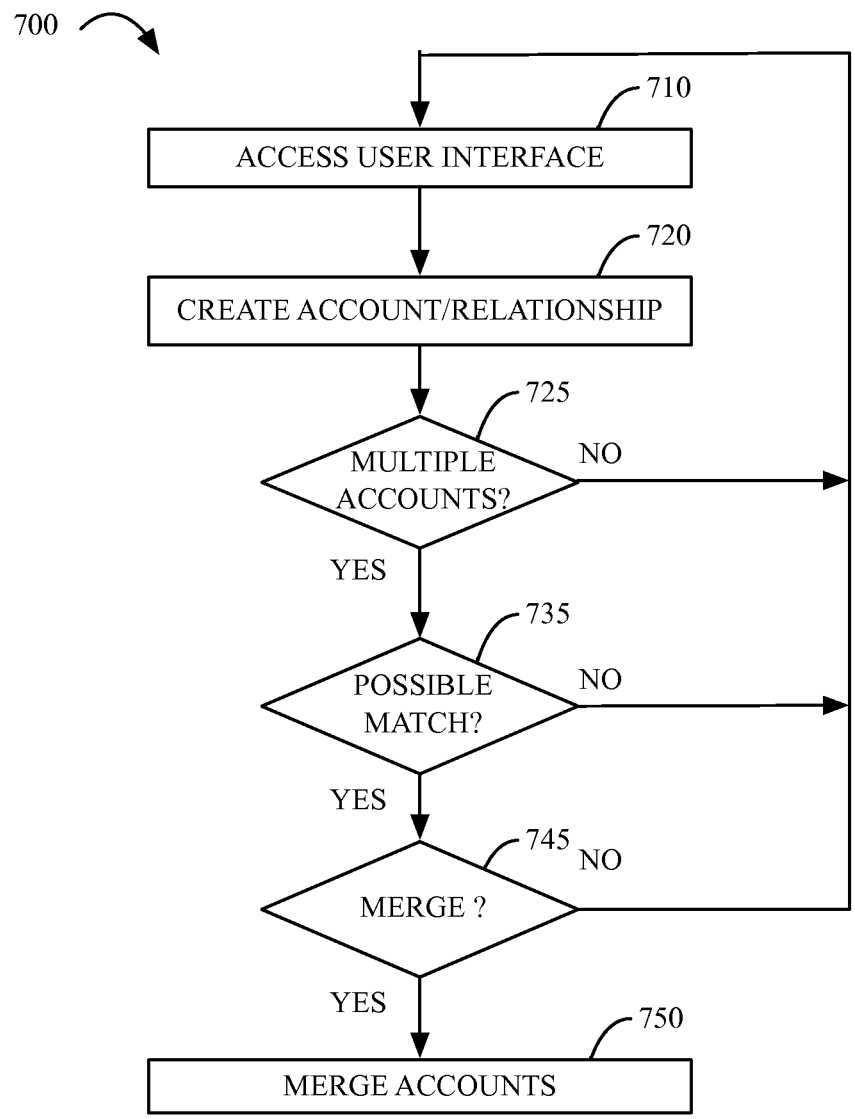
FIG. 7 is a flow chart of a method for a personalized communication network in accordance with a preferred exemplary embodiment of the present invention.

Referring now to FIG. 7, a flowchart 700 for creation of a relationship between a message originator and a message recipient for the exchange of one or more messages is depicted. As shown in FIG. 7, a message originator or message recipient will access a user interface (step 710) to establish an account with another individual or entity to facilitate the exchange of messages (Step 720). In the most preferred embodiments of the present invention, each account will contain information specific to the message originator or message recipient (e.g., name, account number, birthdate, gender, nicknames, addresses, phone numbers, IDs/handles on other networks such as Facebook® or Twitter®, etc.) but the contract information will be maintained by a third party clearing house and will not be directly available to the other party.

There are several ways that the original relationship between the message originator and the message recipient may be established. For example: i) a message recipient may wish to establish a relationship with an organization or entity and the message recipient will then provide the necessary information to the organization or entity and the organization or entity will create the account; ii) a message recipient provides the necessary information while creating an account for communicating with the entity or organization; and iii) the message recipient provides the appropriate information directly to the third party clearing house subsequently identifies one or more organizations or entities with which the message recipient desires to establish a relationship. Those skilled in the art will recognize that there are many variations of these basic methods, all of which are considered within the scope of the present invention. While the message originator will be authorized to communicate with the message recipient, the contact information of the message recipient will be maintained by the third party clearing house and will not be shared with the message originator unless the message recipient authorizes the disclosure. The message originator can identify the message recipient by account name, account number or some other unique identifier established by the message originator.

If a message recipient has established messaging relationships with at least two different organizations or entities (step 725="YES"), the clearing house may be configured to determine that the plurality of accounts are for the same person and relationships the accounts In the most preferred embodiments of the present invention, message recipient accounts for multiple entities would be merged, resulting in a single message recipient account with specific details about the relationship between the message recipient and the message recipient's messaging preferences for each entity being identified in the merged user account.

In order to determine that multiple user accounts, established with disparate message originators are referencing the same message recipient, messaging mechanism 225 of FIG. 2 will employ a user definable matching algorithm to compare various data elements contained in the message recipient's account. For example, using some combination of the message recipient's name, address, GPS location, phone number, email address(es), etc., messaging mechanism 225 of FIG. 2 may be configured to scan multiple user accounts to identify elements of different user accounts that have elements in common. The "matching" threshold may be set as desired for a specific application with more or fewer elements being required to define a "matching" account. Further, messaging mechanism 225 may be configured to use "fuzzy logic" and other techniques known to those skilled in the art to determine if multiple accounts contain the relevant data to indicate a potential match (step 735).

When the user defined threshold for a "match" is met or exceeded (step 735="YES"), then the messaging mechanism 225 may be configured to prompt the message recipient to determine if it is appropriate to merge the accounts (step 745).

If the message recipient grants approval (step 745="YES") then the accounts will be merged (step 750). This process can occur at regularly scheduled intervals or whenever a new account is created, depending on the application.

In some alternative embodiments of the present invention, there may be separate message recipient accounts maintained by each organization or entity and the message recipient information is shared between accounts. The most preferred embodiment of the present invention comprises a single message recipient account where the message recipient's contact information is only available to the clearing house that has been contracted to act as an intermediary between the message recipient and the message originator, and administrators at the message originator can send messages to message recipients without the knowing the message recipient's contact information. The clearinghouse maintains the contact information for each message recipient and forwards the message to the appropriate message recipient(s).

For example, a school district, as a message originator, creates an account for Bruce, who will be a message recipient because Bruce has enrolled one of his children at the school. Bruce may also have established a messaging relationship with other entities as well. For this example, Bruce lives in the city of Mapleton and also has a messaging relationship with the city of Mapleton in order to receive messages from the city of Mapleton. Messaging mechanism 225, noting the commonality between the contact information for Bruce with both entities, may be configured to prompt Bruce to merge his accounts so that his contact information is uniform for both relationships.

Additionally, Bruce works in a nearby town and Bruce has established a messaging relationship with his employer. In this case, messaging mechanism 225 may also recommend merging the employer messaging account information with the messaging account information for the school and the city of Mapleton as well. Once this has been accomplished, whenever Bruce updates his contact information for his account, the contact information may be used by the clearinghouse to send messages to Bruce. This will eliminate the problems of data redundancy and ensure that the messages sent by each entity will use the most recent contact information for Bruce.

Bruce, and other message recipients, can edit their messaging preferences for each messaging relationship by accessing user interface. Typical user messaging preferences may include: the mode of preferred communication (e.g., phone calls, text message, notifications, emails, etc.); the time frame for receiving messages (e.g., time of day, days of the week, etc.); the most preferred devices for receiving various forms of messages; types and identities of organizations from which messages should be received (e.g., restaurants but not bars, car dealers but not grocery stores, etc.). Message recipients may also specify a preferred hierarchy for receiving messages (e.g., phone call first, then text message, then SMS message).

Additionally, message recipients may configure the preferences and permissions for all message platforms for all message originators under certain user-definable circumstances (e.g., preferences and/or permissions could be automatically adjusted when the message recipient is leaving town). Additionally, the message recipient could configure their preferences so that telephone calls were automatically routed to their landline or their cell phone based on the geolocation of the message recipient.

Regardless of the default configurations for message recipients and message originators, messaging preferences may be configured to customize and restrict or authorize the specific pieces of personal information should be shared with the various message originators. Additionally, the personalized communication network may provide user-configurable preferences for the messages that the message recipient desires to receive. For example, if Bruce likes Manny's Diner, he can establish a messaging relationship with Manny's Diner and accept communications from Manny's Diner. Bruce can even tailor the exact types of messages that he receives from Manny's Diner and every other entity with which he has established a messaging relationship (e.g. specify marketing messages about coupons, promotions, etc.). Manny's Diner will only have access to the personal information that Bruce chooses to share. For purposes of sending messages to Bruce, Manny's Diner does not need to know Bruce's contact information because messaging mechanism 225 of FIG. 2 has access to Bruce's contact information and can send the messages to Bruce on behalf of Manny's Diner.

It is important to note that even though all user contact information may be consolidated, the messaging preference for each messaging relationship may be unique. For example, Bruce may configure his messaging preferences so that his favorite restaurant can only send text messages to him during certain times of the day. If the restaurant only records an audio file and wants to send that as a message, then messaging mechanism 225 will send Bruce a text message containing a link to the audio message and Bruce may click on the link to listen to the audio file. Alternatively, Bruce may direct messaging mechanism 225 to transcribe the audio file and send the text of the audio file as a text message.

In order to obtain maximum utility from the various preferred embodiments of the present invention, it is useful for message recipients to be made aware of the possibility of establishing a messaging relationship with as many potential message originators as possible, with each new messaging relationship becoming part of the message recipient's personalized communication network. For example, messaging mechanism 225 may be configured to make recommendations to a message recipient or message originator regarding other potential messaging relationships that maybe established. If Bruce has established messaging relationships with multiple restaurants in a given geographic area, messaging mechanism 225 may recommend establishing a messaging relationship with other restaurants in the same geographic area or similar restaurants (e.g., highly rated Thai or Chinese restaurants) in other geographic areas based on Bruce's other messaging relationships. Similarly, Bruce may configure the app on his smartphone to alert him about any message originators that are located in his geographical vicinity based on the GPS coordinates provided by Bruce's smartphone.

Alternatively, an organization or entity may display a logo or other indicia that indicates their participation in the personalized communication network system to which Bruce subscribes. Bruce may see this logo or indicia on a web page, at a brick and mortar storefront or other advertisement distributed by the organization and choose to add the organization to his personalized communication network. Each organization may have their own app or there may be a MasterApp that the organization and Bruce can both subscribe to and follow. In any case, the contact information for each message recipient will be maintained by the clearinghouse.

In at least some preferred embodiments of the present invention, a directory of potential message originators may be made available to message recipients and each message recipient may choose to add one or more message originators to their personalized communication network. Similarly, a message recipient may "opt in" to the personalized communication network system and identify that they are interested in establishing messaging relationships with certain types of message originators. Whenever a match is made, the message originator and message recipient will both be presented with the relevant information and, if both are agreeable, the messaging relationship will be established by messaging mechanism 225.

In addition to these methods, the message recipient may have already shared some identifying information with an entity that is a message originator. For instance, the message recipient may already have a messaging relationship with the local school district. Then, the message recipient provides their local supermarket with some contact information to join the supermarket's rewards program. The supermarket may then provide that information to messaging mechanism 225, and if information matches an existing message recipient account, a request to establish a messaging relationship may be created and forwarded to the message recipient. The message recipient would have to confirm the relationship before any messages will be sent to the message recipient from the message originator with whom the message recipient does not yet have a confirmed relationship.

In yet another preferred embodiment of the present invention, an organization may request permission to alert potential message recipients about the availability of the organization on the personalized communication network system. Messaging mechanism 225 may be configured to "push" notifications to message recipients who have authorized contact with potential message originators. In each case, the message recipient can decide whether or not to add a potential message originator to their personalized communication network. The message recipient's contact preferences may be tied to pre-configured defaults (e.g., "high privacy," "medium privacy" and "low privacy") where each default allows a different level of contact to be made by potential message originators.

Additionally, in certain preferred embodiments of the present invention, once a message recipient has downloaded one mobile app to establish a messaging relationship with one entity, messaging mechanism 225 of FIG. 2 may be configured to notify the message recipient about other apps provided by other entities that may also be of interest. For example, an individual who has children attending Provo schools may have downloaded a Provo school district app, but not the Provo city app that is available for messaging relationships on the same personalized communication network. Provo city administrators may request that messaging mechanism 225 contact message recipients who are residents of Provo city who have not yet downloaded the Provo city app but have accounts with other entities on the same network or have downloaded apps for other entities on the same network. Messaging mechanism 225 can be configured to send a push notification or other type of message to the user stating "Since you live in Provo, you might be interested in the Provo city app. Press this link to download the Provo city app and establish a messaging relationship with the city of Provo." The terms of service for the other apps will typically include a clause permitting the service provider that is operating messaging mechanism 225 to ask the users if they would like to be notified about other services for which they might be interested. This would be an "opt in" feature. The same type of query may be performed if one entity wanted to update its contact information for message recipients. For example, assuming that Provo city did not have the cell phone number of one or more message recipients, Provo city might seek permission for message recipients using the Provo school app to share their cell phone information with Provo city.

It should be noted that even though a message originator includes certain content in a message (e.g., audio-video content), some intended message recipients may not have devices capable of receiving the content included in the message created by the message originator. However, this is not a problem because the message originator does not need to know about the capabilities of the message recipient's devices. Messaging mechanism 225 of FIG. 2 will access database 223 of FIG. 2 and ascertain what message platforms are appropriate for each designated message recipient to ensure that only compatible message content is delivered to each message recipient. The most "content-rich" option will be selected for each message recipient.

In addition, the message originator may also specify message translation options and a time frame for message delivery that, in certain circumstances, may include an "emergency" designation that would override the message recipient's message receipt preferences to ensure that emergency messages are delivered immediately. After all of the relevant and desired message parameters have been specified, the message will be stored in database 223 of FIG. 2 for later delivery of the message by messaging mechanism 225 of FIG. 2.

Additionally, in at least some preferred embodiments of the present invention, the time frame and priorities for message delivery options may be automatically ascertained and assigned by reference to a one or more identification factors. For example, any message sent to a group of recipients identified as "Teachers" may be automatically scheduled for delivery at the beginning of the school day and sent via email to the email address for each of the teachers included in the "Teacher" group.

Figure 8:
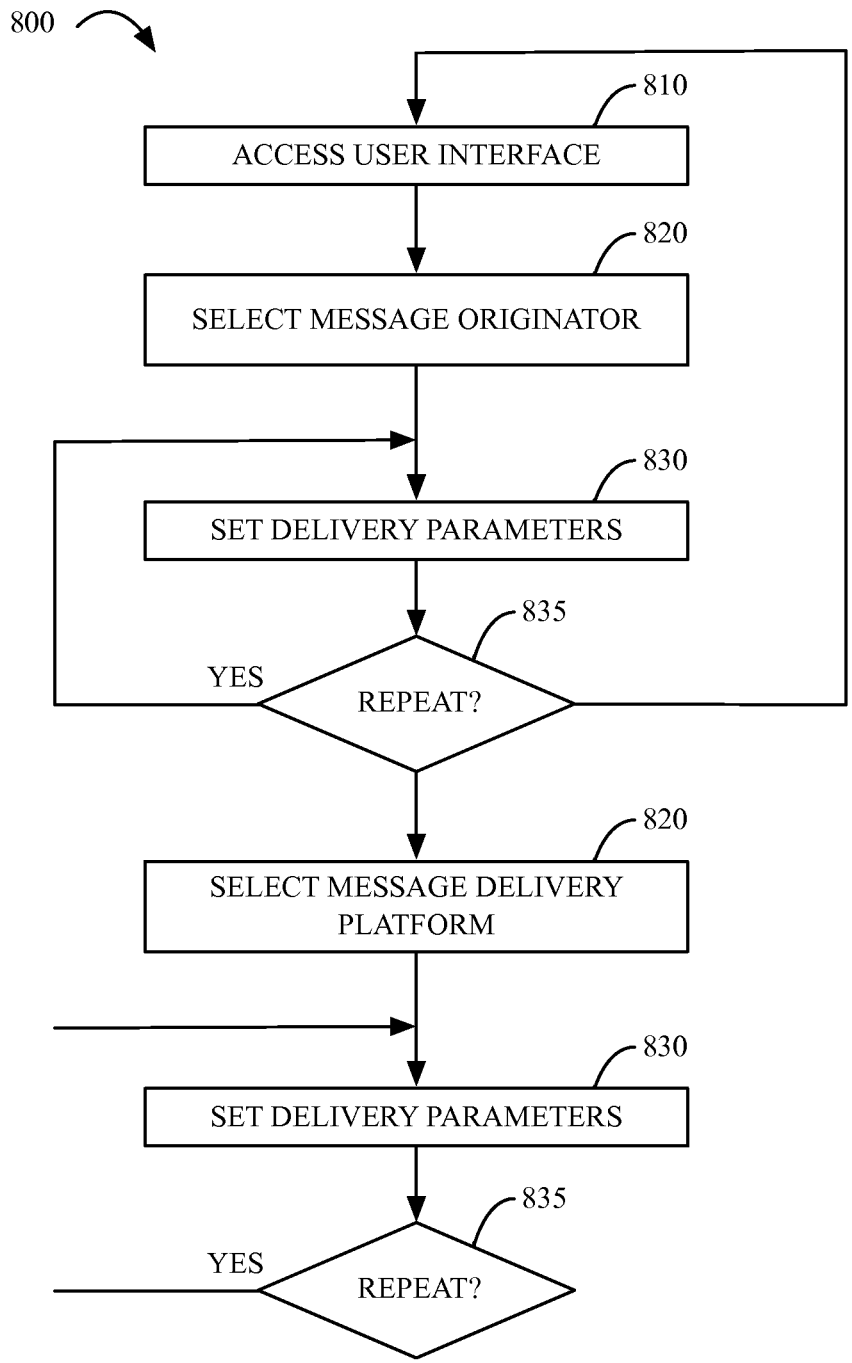
FIG. 8 is a flow chart of a method for setting message receipt preferences for a personalized communication network in accordance with a preferred exemplary embodiment of the present invention.

Referring now to FIG. 8, an overall process and method 800 for setting message recipient preferences for receiving messages in accordance with a preferred embodiment of the present invention is shown. As shown in FIG. 8, a message recipient will access a user interface (step 810) to specify their preferred message receipt options. The user interface may be user interface 224 of FIG. 2 or a user interface accessed via mobile communication device 190 of FIG. 1 (e.g., an "app" on a smart phone). The message recipient will select one or more message delivery platforms (e.g., email, text message, telephone, snail mail, etc.) for receiving messages from message originators (step 820) and, if desired, specify delivery parameters associated with each message delivery platform (step 830), repeating as necessary (step 835="YES") until all intended message platforms and message originators have been identified (step 835="NO") at which point the message recipient will exit the message receipt preferences portion of the user interface (step 840).

Figure 9:
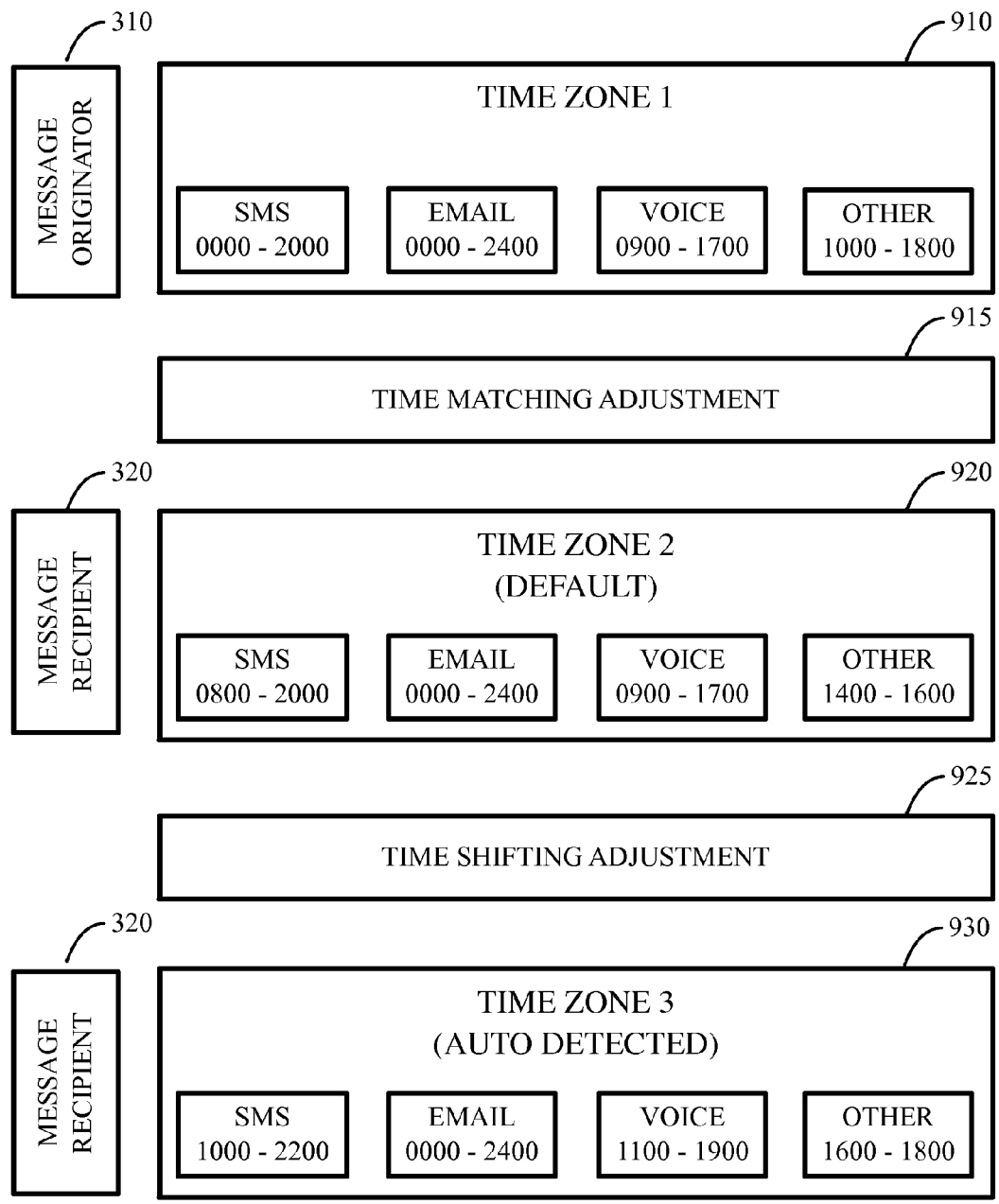
FIG. 9 is a schematic representation of a message delivery window matching function in accordance with a preferred exemplary embodiment of the present invention.

Referring now to FIG. 9, a schematic representation of a message delivery window matching function in accordance with a preferred exemplary embodiment of the present invention is depicted. As shown in FIG. 9, there are at least three relevant messaging windows to consider for each message to be delivered from a message originator 310 to a message recipient 320. In the most preferred embodiments of the present invention, messaging mechanism 225 of FIG. 2 is configured to deliver messages from message originator 310 to message originator 320 in the most appropriate time frame, as determined by the three messaging windows.

Messaging window 910 is the messaging window associated with message originator 310. Each message originator 310 can configure the preferred time frames for sending messages to message recipients 320. As shown in FIG. 9, a specific time "window" for emails, SMS messages, voice calls, and other types of messages to be delivered can be established or identified. As previously explained, each user has an account where user preferences are stored. The preferred times frames can be configured by each user in accordance with their specific needs and wishes.

Messaging window 920 is the messaging window associated with the default time zone for message recipient 320. Each message recipient 320 can configure the preferred time frames for receiving messages from message originators 310. As shown in FIG. 9, a specific time "window" for emails, SMS messages, voice calls, and other types of messages to be received can be established or identified. As previously explained, each user has an account where user preferences are stored. The preferred times frames can be configured by each user in accordance with their specific needs and wishes.

In practice, when a message is to be delivered from a message originator 310 to a message recipient 320, a time matching adjustment algorithm will be applied by messaging mechanism 225. This means that messaging mechanism 225 will identify the "best fit" message delivery window for the type of message specified by message originator 310 based on the preferred message delivery and receipt times specified by message originator 320 to a message recipient 320, as well as other relevant factors. For example, if there is an direct overlap of the preferred message delivery time and the preferred message receipt time, messaging mechanism 225 will deliver the message in this "overlap" window.

Additionally, based on the size of the overlap window, the actual delivery time may be further adjusted based on system level preferences. For example, it may be less expensive to send or deliver certain types of messages at certain times of the day in which case the actual time for delivery of the message may be adjusted. Similarly, if a single message is to be delivered to multiple message recipients 320, then the timing for delivery of the message to each of message recipient 320 may be adjusted to prioritize delivery to those with the earliest times, as specified in their respective message recipient windows.

Messaging window 930 is the message window associated with the time adjusted or time shifted location of message recipient 320. In addition to the "best fit" matching process described above, each message recipient 320 can selectively configure their profile or preferences to have their preferred message delivery window "time shifted," based on one or more parameters. For example, if enabled by message recipient 320, the app on their mobile communication device may provide the geolocation of message recipient 320 to messaging mechanism 225. This would allow messaging mechanism 225 to apply a time shifting adjustment algorithm 925 to message recipient's message receipt preferences, allowing for messages to be delivered in the same time window, as adjusted for message recipient geolocation. Similarly, message recipient 320 could simply specify a time offset (e.g., +1 hour, +2 hours, −3 hours, etc.) and messaging mechanism will adjust the delivery schedule for the relevant message accordingly.

If there is no overlap, then the message will still be delivered but one of the specified window preferences will have to be ignored. Once again, user preferences may be set to override one or the other set of preferences, depending on the urgency of the message and the nature of the relationship between message originator 310 and message recipient 320. In any case, messaging mechanism 225 will ensure that the message is delivered in the most appropriate time frame.

As will be appreciated by one skilled in the art, aspects of the computer-based system for providing a personalized communication network disclosed herein may be embodied as a system, method or computer program product. Accordingly, aspects of the computer-based system for providing a personalized communication network may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the computer-based system for providing a personalized communication network may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the computer-based system for providing a personalized communication network may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

From the foregoing description, it should be appreciated that computer-based system 100 and method for a personalized communication system disclosed herein presents significant benefits that would be apparent to one skilled in the art. Furthermore, while multiple embodiments have been presented in the foregoing description, it should be appreciated that a vast number of variations in the embodiments exist. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. An apparatus comprising:
   at least one processor;
   at least one memory coupled to the at least one processor;
   a plurality of message originator profiles residing in the at least one memory, each of the plurality of message originator profiles comprising a plurality of message originator messaging preferences;
   a plurality of message recipient profiles residing in the at least one memory, each of the plurality of message recipient profiles, wherein each of the plurality of message recipient profiles comprises:
      a plurality of message recipient messaging preferences;
      a plurality of contact information; and
      a plurality of message platforms;
   a first messaging relationship established between a first message originator and a first message recipient; and
   a messaging mechanism residing in the at least one memory, the messaging mechanism delivering at least one message to the first message recipient based on the first messaging relationship between the first message originator and the first message recipient, the at least one message being delivered based on the message recipient messaging preferences and the message originator messaging preferences wherein the messaging mechanism shields the plurality of message recipient messaging preferences, the plurality of contact information, and the plurality of message platforms from the first message originator, wherein the messaging mechanism evaluates the plurality of message recipient profiles by comparing at least one of the plurality of message recipient messaging preferences, the plurality of contact information and the plurality of message platforms for a plurality of message recipients and merges at least two message recipient profiles based on similarities found in the at least two message recipient profiles to create a merged message recipient profile and wherein the messaging mechanism provides the message recipient associated with the merged message recipient profile an opportunity to authorize the plurality of messaging relationships.

2. The apparatus of claim 1 wherein the plurality of message platforms comprises at least one of a SMS message, an email message, a video message, a push notification, a social media message, and an audio message.

3. The apparatus of claim 1 wherein the plurality of message recipient messaging preferences comprises at least one of a category preference, a date preference, a time preference, a message platform preference and wherein the plurality of message originator messaging preferences comprising at least one of a message category preference, a day of the week preference, a time preference, a priority preference, a message platform preference, a language preference.

4. The apparatus of claim 1 wherein the plurality of contact information comprises at least one of an address, a phone number, an employer, and wherein the messaging mechanism employs a user configurable matching algorithm to parse the plurality of contact information to locate one or more message originators from which the first message recipient may wish to receive messages.

5. The apparatus of claim 1 wherein the first messaging relationship is established based on the geolocation of the first message recipient and the geolocation of the first message originator.

6. The apparatus of claim 1 further comprising a second messaging relationship established between the first message recipient and a second message originator wherein the second messaging relationship is based on a selection made by the first message originator choosing from the plurality of message originators profiles where the plurality of message originators profiles are listed in a database of message originators.

7. The apparatus of claim 1 wherein the first messaging relationship is a critical messaging relationship and the first message originator's messaging preferences override the plurality of message recipient messaging preferences for the first message recipient.

8. The apparatus of claim 1 wherein the messaging mechanism transmits a plurality of messages from a plurality of message originators to a plurality of message recipients, wherein each of the plurality of messages is transmitted based on a plurality of messaging relationships, with at least one of the plurality of messaging relationships being established between each of the plurality of message originators and each of the plurality of message recipients, and wherein at least some of the plurality of messaging relationships are critical messaging relationships and at least some of the plurality of messaging relationships are non-critical messaging relationships.

9. The apparatus of claim 1 further comprising a user interface, the user interface providing access to the each of the plurality of message recipient profiles and wherein the first message recipient can modify a message recipient profile for the first message recipient by modifying at least one of the plurality of message recipient messaging preferences, the plurality of contact information and the plurality of message platforms in a single location to create a modified message recipient profile for the first message recipient, thereby impacting the delivery of subsequent messages from a plurality of message originators without providing the plurality of message originators with access to the modified message recipient profile.

10. The apparatus of claim 1 wherein the first message recipient has established a plurality of messaging relationships with a plurality of message originators and wherein at least some of the plurality of messaging relationships provide for the delivery of a plurality of messages via a plurality of message delivery parameters and wherein the first message recipient modifies at least one of the first message recipient's messaging preferences, the first message recipient's plurality of contact information, and the first message recipients plurality of message platforms; thereby altering the message delivery parameters for at least two of the plurality of messaging relationships.

11. The apparatus of claim 1 wherein the first message originator suggests the creation of a messaging relationship between the first message recipient and a second message originator and wherein the first message recipient is provided with an opportunity to accept or reject the relationship with the second message originator.

12. The apparatus of claim 1 wherein the messaging mechanism suggests the creation of a messaging relationship between the first message recipient and a second message originator based on a geolocation for the first message recipient and a geolocation for the second message originator and wherein the first message recipient creates the messaging relationship in response to a visual image displayed to the first message recipient on a mobile communication device.

13. The apparatus of claim 1 wherein the message mechanism automatically establishes a plurality of messaging relationships between a plurality of message originators and a message recipient associated with the merged message recipient profile.

14. The apparatus of claim 1 wherein the message mechanism automatically adjusts at least one of the plurality of message recipient messaging preferences, the plurality of contact information, and the plurality of message platforms based on the geolocation of the first message recipient.

15. A method comprising the steps of:
creating a plurality of message recipient profiles for a plurality of message recipients, each message recipient profile comprising a plurality of message recipient messaging preferences;
creating a plurality of message originator profiles for a plurality of message originators, each message originator profile comprising a plurality of message originator messaging preferences;
establishing a first messaging relationship between a first message originator selected from the plurality of message originators and a first message recipient selected from the plurality of message recipients;
delivering at least one message to the first message recipient based on the plurality of message recipient messaging preferences and the plurality of message originator messaging preferences;
shielding the plurality of message recipient messaging preferences, the plurality of contact information, and the plurality of message platforms from the first message originator while delivering the at least one message;
evaluating the plurality of message recipient profiles by comparing the plurality of message recipient messaging preferences and merging at least two message recipient profiles based on similarities found in the at least two message recipient profiles to create a merged message recipient profile; and
providing a message recipient associated with the merged message recipient profile an opportunity to authorize a plurality of messaging relationships.

16. The method of claim 15 wherein the first messaging relationship is a critical messaging relationship established by an entity that has a pre-existing relationship with the first message recipient and wherein the first message recipient has the ability to sever the first messaging relationship.

17. The method of claim 15 wherein the first message originator suggests establishing a second messaging relationship between the first message recipient and a second message originator.

18. The method of claim 15 wherein the step of establishing the first messaging relationship between the first message originator and the first message recipient comprises the steps of at least one action selected from the following group of actions:
sending a suggestion for the first messaging relationship from a messaging mechanism; and
using a mobile communication device to scan a QR code to establish the first messaging relationship; and
downloading an app to a mobile communication device initiated by the first message recipient; and
displaying a list of potential message originators to the first message recipient via a user interface and establishing the first messaging relationship based on a response to the list of potential message originators submitted by the first message recipient; and
using a GPS coordinate to establish the first messaging relationship.

19. The method of claim 15 further comprising a second messaging relationship established between the first message recipient and a second message originator wherein the second messaging relationship is based on a selection made by the second message originator and wherein the first message recipient authorizes the establishment of the second messaging relationship.

20. The method of claim 15 further comprising a second messaging relationship established between the first message recipient and a second message originator wherein the second messaging relationship is based on at least one identifying characteristic related to the first message recipient that has been provided to the second message originator and wherein the first message recipient authorizes the establishment of the second messaging relationship.

21. The method of claim 15 wherein the step of establishing a plurality of messaging preferences for the first message recipient comprises step of identifying a plurality of message categories and associating at least one of the plurality of message categories with the first message originator so as to provide for the delivery of a plurality of messages from the first message originator that belong to the at least one of the plurality of message categories while preventing the delivery of a plurality of message from the first message originator that do not belong to the at least one of the plurality of message categories.

22. The method of claim 15 wherein the step of establishing a plurality of messaging preferences for the first message recipient comprises step of identifying a plurality of message categories and associating at least one of the plurality of message categories with at least one of a plurality of specific message delivery options.

23. The method of claim 15 wherein the plurality of specific message delivery options comprise at least an SMS message and a phone call and a social media post.

* * * * *